United States Patent
Zong et al.

(10) Patent No.: US 11,837,149 B2
(45) Date of Patent: Dec. 5, 2023

(54) DRIVING METHOD FOR DISPLAY PANEL, DISPLAY PANEL AND DISPLAY APPARATUS

(71) Applicant: BOE TECHNOLOGY GROUP CO., LTD., Beijing (CN)

(72) Inventors: Shaolei Zong, Beijing (CN); Xin Duan, Beijing (CN); Jigang Sun, Beijing (CN); Wei Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/925,872

(22) PCT Filed: Jan. 4, 2021

(86) PCT No.: PCT/CN2021/070177
§ 371 (c)(1),
(2) Date: Nov. 17, 2022

(87) PCT Pub. No.: WO2022/134207
PCT Pub. Date: Jun. 30, 2022

(65) Prior Publication Data
US 2023/0196975 A1 Jun. 22, 2023

(30) Foreign Application Priority Data
Dec. 21, 2020 (WO) ............... PCT/CN2020/138099

(51) Int. Cl.
*G09G 3/20* (2006.01)

(52) U.S. Cl.
CPC ... *G09G 3/2096* (2013.01); *G09G 2310/0267* (2013.01); *G09G 2310/0275* (2013.01); *G09G 2310/04* (2013.01); *G09G 2310/08* (2013.01); *G09G 2354/00* (2013.01)

(58) Field of Classification Search
None
See application file for complete search history.

(56) References Cited

U.S. PATENT DOCUMENTS

| 2003/0016202 A1 | 1/2003 | Edwards et al. |
| 2017/0358264 A1 | 12/2017 | Kosuge et al. |
| 2019/0237021 A1* | 8/2019 | Peng ............... G09G 5/003 |
| 2019/0371243 A1* | 12/2019 | Yang ............... G09G 3/3233 |

FOREIGN PATENT DOCUMENTS

| CN | 101089679 A | 12/2007 |
| CN | 102737602 A | 10/2012 |
| CN | 103218964 A | 7/2013 |
| CN | 106504722 A | 3/2017 |
| CN | 106652972 A | 5/2017 |
| CN | 108139799 A | 6/2018 |
| CN | 108986749 A | 12/2018 |

(Continued)

*Primary Examiner* — Ifedayo B Iluyomade

(74) *Attorney, Agent, or Firm* — HOUTTEMAN LAW LLC

(57) ABSTRACT

A driving method for a display panel, a display panel and a display apparatus, including: determining a gaze region, watched by eyes of a user, in a display region of the display panel; and refreshing data of at least some of sub-pixels in the display panel according to a set rule and in combination with the gaze region.

16 Claims, 20 Drawing Sheets

S10: Determining the gaze region, watched by eyes of the user, in the display region of the display panel within K display frames of a refresh cycle S20: In the refresh cycle, refreshing data of the sub-pixels in the gaze region by adopting the first refresh frequency, and refreshing data of the sub-pixels in the non-gaze region except the gaze region by adopting the second refresh frequency

(56) References Cited

FOREIGN PATENT DOCUMENTS

| | | |
|---|---|---|
| CN | 110023881 A | 7/2019 |
| CN | 110517633 A | 11/2019 |
| CN | 111933038 A | 11/2020 |
| KR | 20080096935 A | 11/2008 |
| WO | WO 2013031552 A1 | 3/2013 |

\* cited by examiner

DRIVING METHOD FOR DISPLAY PANEL, DISPLAY PANEL AND DISPLAY APPARATUS

CROSS-REFERENCE TO RELATED APPLICATIONS

The present application claims the priority of the patent application No. PCT/CN2020/138099 filed to the CNIPA on Dec. 21, 2020, entitled "driving method for display panel, display panel and display apparatus", the contents of which are incorporated herein by reference in its entirety.

TECHNICAL FIELD

The present disclosure relates to the field of display technology, and in particular to a driving method for a display panel, a display panel and a display apparatus.

BACKGROUND

With the constant development of the display technology, people's daily life is full of various display apparatuses, such as a mobile phone, a tablet computer, a Virtual Reality (VR) device, or the like. In a practical application, a fixed refresh frequency is generally used in a display panel in a display apparatus, which easily causes a poor visual effect of a screen display with high requirements on a display image quality and which easily causes a waste of power consumption with low requirements on the display image quality.

SUMMARY

A driving method for a display panel according to an embodiment of the present disclosure includes: determining a gaze region, watched by eyes of a user, in a display region of the display panel; and refreshing data of at least some of sub-pixels in the display panel according to a set rule and in combination with the gaze region.

In some examples, the gaze region, watched by eyes of the user, in the display region of the display panel is determined within K display frames of a refresh cycle; where the refresh cycle includes M consecutive display frames; M is an integer greater than 1, K is an integer greater than 0; the refreshing data of at least some of sub-pixels in the display panel according to a set rule and in combination with the gaze region includes: the gaze region, watched by eyes of the user, in the display region of the display panel is determined within K display frames of a refresh cycle; where the refresh cycle includes M consecutive display frames; M is an integer greater than 1, K is an integer greater than 0; in the refresh cycle, refreshing data of the sub-pixels in the gaze region by adopting a first refresh frequency, and refreshing data of the sub-pixels in a non-gaze region except the gaze region by adopting a second refresh frequency; wherein the first refresh frequency is different from the second refresh frequency.

In some examples, the second refresh frequency is lower than the first refresh frequency.

In some examples, the second refresh frequency is (M−K)/M times of the first refresh frequency; where K<M.

In some examples, the refreshing data of the sub-pixels in the gaze region by adopting a first refresh frequency, and refreshing data of the sub-pixels in a non-gaze region except the gaze region by adopting a second refresh frequency includes: only refreshing data for the gaze region in the K display frames; and refreshing data of the sub-pixels in the gaze region and the non-gaze region in display frames except the K display frames in the refresh cycle.

In some examples, M=2, the gaze region, watched by eyes of the user, in the display region of the display panel is determined within an odd display frame of the refresh cycle; the only refreshing data for the gaze region in the K display frames; and refreshing data of the sub-pixels in the gaze region and the non-gaze region in display frames except the K display frames in the refresh cycle includes: only refreshing data for the gaze region within the odd display frame of the refresh cycle; and refreshing data of the sub-pixels in the gaze region and the non-gaze region in an even display frame of the refresh cycle.

In some examples, the display region includes a plurality of sub-pixels, a plurality of scanning lines, a plurality of data lines, and a plurality of frequency modulation control lines provided therein; one row of the sub-pixels corresponds to at least one scanning line of the plurality of scanning lines, and one column of the sub-pixels corresponds to at least one data line of the plurality of data lines and at least one frequency modulation control line of the plurality of frequency modulation control lines; each sub-pixel includes: a data writing circuit, a frequency modulation control circuit and a storage electrode; wherein a control terminal of the data writing circuit is coupled to a corresponding scanning line, a first terminal of the data writing circuit is coupled to a corresponding data line, and a second terminal of the data writing circuit is coupled to a first terminal of the frequency modulation control circuit; a control terminal of the frequency modulation control circuit is coupled to a corresponding frequency modulation control line, and a second terminal of the frequency modulation control circuit is coupled to a corresponding storage electrode; the only refreshing data for the gaze region within the odd display frame of the refresh cycle includes: loading gate turn-on signals to the plurality of scanning lines row by row in the odd display frame, so as to control the data writing circuits in the sub-pixels row by row to electrically connect the corresponding data lines and the frequency modulation control circuits coupled to the data writing circuits; loading frequency modulation turn-on signals on frequency modulation control lines corresponding to the sub-pixels in the gaze region and loading frequency modulation turn-off signals on frequency modulation control lines except the frequency modulation control lines corresponding to the sub-pixels in the gaze region when gate turn-on signals are loaded on scanning lines corresponding to sub-pixels in the gaze region, to control frequency modulation control circuits in the sub-pixels in the gaze region to electrically connect the data writing circuits and the storage electrodes coupled to the frequency modulation control circuits; and loading data signals to the data lines corresponding to the sub-pixels in the gaze region; the refreshing data of the sub-pixels in the gaze region and the non-gaze region in the even display frame of the refresh cycle includes: loading gate turn-on signals to the plurality of scanning lines row by row in the even display frame, so as to control the data writing circuits in the sub-pixels row by row to electrically connect the corresponding data lines and the frequency modulation control circuits coupled to the data writing circuits; loading frequency modulation turn-on signals to each frequency modulation control line, so as to control frequency modulation control circuits in the sub-pixels to electrically connect the data writing circuits and the storage electrodes coupled to the frequency modulation control circuits; and loading data signals to the data lines corresponding to the sub-pixels.

In some examples, M=2, the gaze region, watched by eyes of the user, in the display region of the display panel is determined within an even display frame of the refresh cycle; the only refreshing data for the gaze region in the K display frames; and refreshing data of the sub-pixels in the gaze region and the non-gaze region in display frames except the K display frames in the refresh cycle includes: refreshing data of the sub-pixels in the gaze region and the non-gaze region within an odd display frame of the refresh cycle; and only refreshing data for the gaze region in the even display frame of the refresh cycle.

In some examples, the display region includes a plurality of sub-pixels, a plurality of scanning lines, a plurality of data lines, and a plurality of frequency modulation control lines provided therein; one row of the sub-pixels corresponds to at least one scanning line of the plurality of scanning lines, and one column of the sub-pixels corresponds to at least one data line of the plurality of data lines and at least one frequency modulation control line of the plurality of frequency modulation control lines; each sub-pixel includes: a data writing circuit, a frequency modulation control circuit and a storage electrode; wherein a control terminal of the data writing circuit is coupled to a corresponding scanning line, a first terminal of the data writing circuit is coupled to a corresponding data line, and a second terminal of the data writing circuit is coupled to a first terminal of the frequency modulation control circuit; a control terminal of the frequency modulation control circuit is coupled to a corresponding frequency modulation control line, and a second terminal of the frequency modulation control circuit is coupled to a corresponding storage electrode; the refreshing data of the sub-pixels in the gaze region and the non-gaze region within the odd display frame of the refresh cycle includes: loading gate turn-on signals to the plurality of scanning lines row by row in the odd display frame, so as to control the data writing circuits in the sub-pixels row by row to electrically connect the corresponding data lines and the frequency modulation control circuits coupled to the data writing circuits; loading frequency modulation turn-on signals to each frequency modulation control line, so as to control frequency modulation control circuits in the sub-pixels to electrically connect the data writing circuits and the storage electrodes coupled to the frequency modulation control circuits; and loading data signals to the data lines corresponding to the sub-pixels; the only refreshing data for the gaze region in the even display frame of the refresh cycle includes: loading gate turn-on signals to the plurality of scanning lines row by row in the even display frame, so as to control the data writing circuits in the sub-pixels row by row to electrically connect the corresponding data lines and the frequency modulation control circuits coupled to the data writing circuits; loading frequency modulation turn-on signals on frequency modulation control lines corresponding to the sub-pixels in the gaze region and loading frequency modulation turn-off signals on frequency modulation control lines except the frequency modulation control lines corresponding to the sub-pixels in the gaze region when gate turn-on signals are loaded on scanning lines corresponding to sub-pixels in the gaze region, to control frequency modulation control circuits in the sub-pixels in the gaze region to electrically connect the data writing circuits and the storage electrodes coupled to the frequency modulation control circuits; and loading data signals to the data lines corresponding to the sub-pixels in the gaze region.

In some examples, the gaze region, watched by eyes of the user, in the display region of the display panel is determined within at least one display frame; the refreshing data of at least some of the sub-pixels in the display panel according to a set rule and in combination with the gaze region includes: compressing initial image data corresponding to the non-gaze region except the gaze region in the display region, to determine the compressed image data corresponding to the non-gaze region; wherein a data amount of the compressed image data corresponding to the non-gaze region is less than that of the initial image data corresponding to the non-gaze region; sending the initial image data corresponding to the gaze region and the compressed image data corresponding to the non-gaze region to the display panel, and then decompressing the compressed image data corresponding to the non-gaze region; and refreshing data of the sub-pixels in the display panel according to the initial image data corresponding to the gaze region and the decompressed target image data corresponding to the non-gaze region.

In some examples, the compressing initial image data corresponding to the non-gaze region except the gaze region in the display region, to determine the compressed image data corresponding to the non-gaze region includes: dividing the non-gaze region into a first non-gaze region and a second non-gaze region, dividing pixel units in the first non-gaze region into a plurality of first unit groups, and dividing pixel units in the second non-gaze region into a plurality of second unit groups; wherein the sub-pixels in the first non-gaze region and the sub-pixels in the gaze region are located in different rows; the sub-pixels in the second non-gaze region and the sub-pixels in the gaze region are located in a same row; each pixel unit includes a plurality of sub-pixels, each first unit group includes a plurality of pixel units adjacent to each other, and each second unit group includes a plurality of pixel units adjacent to each other; and compressing initial image data corresponding to each pixel unit in each first unit group and each second unit group, to determine the compressed image data in one-to-one correspondence with the plurality of first unit groups, and to determine the compressed image data in one-to-one correspondence with the plurality of second unit groups.

In some examples, the determining the compressed image data in one-to-one correspondence with the plurality of first unit groups includes: determining initial image data corresponding to one pixel unit in each first unit group as the compressed image data in one-to-one correspondence with the plurality of first unit groups; or determining an average value of initial image data corresponding to the sub-pixels with the same color in each pixel unit in each first unit group as the compressed image data in one-to-one correspondence with the plurality of first unit groups.

In some examples, the determining the compressed image data in one-to-one correspondence with the plurality of second unit groups includes: determining initial image data corresponding to one pixel unit in each second unit group as the compressed image data in one-to-one correspondence with the plurality of second unit groups; or determining an average value of initial image data corresponding to the sub-pixels with the same color in each pixel unit in each second unit group as the compressed image data in one-to-one correspondence with the plurality of second unit groups.

In some examples, the decompressing the compressed image data corresponding to the non-gaze region includes: determining the compressed image data in one-to-one correspondence with the plurality of first unit groups as target image data corresponding to each pixel unit in each first unit group; and determining the compressed image data in oneto-one correspondence with the plurality of second unit groups as target image data corresponding to each pixel unit in each second unit group.

In some examples, the display region includes a plurality of sub-pixels, a plurality of scanning lines, a plurality of data lines, and a plurality of frequency modulation control lines provided therein; one row of the sub-pixels corresponds to at least one scanning line of the plurality of scanning lines, and one column of the sub-pixels corresponds to at least one data line of the plurality of data lines and at least one frequency modulation control line of the plurality of frequency modulation control lines; each sub-pixel includes: a data writing circuit, a frequency modulation control circuit and a storage electrode; wherein a control terminal of the data writing circuit is coupled to a corresponding scanning line, a first terminal of the data writing circuit is coupled to a corresponding data line, and a second terminal of the data writing circuit is coupled to a first terminal of the frequency modulation control circuit; a control terminal of the frequency modulation control circuit is coupled to a corresponding frequency modulation control line, and a second terminal of the frequency modulation control circuit is coupled to a corresponding storage electrode; the refreshing data of the sub-pixels in the display panel includes: loading gate turn-on signals to the plurality of scanning lines row by row, so as to control the data writing circuits in the sub-pixels to electrically connect the data lines and the frequency modulation control circuits coupled to the data writing circuits row by row; loading a frequency modulation turn-on signal to each frequency modulation control line, so as to control the frequency modulation control circuits in the sub-pixels to electrically connect the data writing circuits and the storage electrodes coupled to the frequency modulation control circuits; and loading data signals to the data lines corresponding to the sub-pixels.

A driving circuit for a display panel according to the embodiment of the present disclosure includes: a region determination circuit configured to determine a gaze region, watched by eyes of a user, in a display region of the display panel; and a refreshing control circuit configured to refresh data of at least some of the sub-pixels in the display panel according to a set rule and in combination with the gaze region.

A display panel according to the embodiment of the present disclosure includes: a plurality of sub-pixels, a plurality of scanning lines, a plurality of data lines, and a plurality of frequency modulation control lines provided therein; wherein one row of the sub-pixels corresponds to at least one scanning line of the plurality of scanning lines, and one column of the sub-pixels corresponds to at least one data line of the plurality of data lines and at least one frequency modulation control line of the plurality of frequency modulation control lines; each sub-pixel includes: a data writing circuit, a frequency modulation control circuit and a storage electrode; wherein a control terminal of the data writing circuit is coupled to a corresponding scanning line, a first terminal of the data writing circuit is coupled to a corresponding data line, and a second terminal of the data writing circuit is coupled to a first terminal of the frequency modulation control circuit; and the data writing circuit is configured to electrically connect the corresponding data line and the frequency modulation control circuit coupled to the data writing circuit in response to a signal on the corresponding scanning line coupled to the data writing circuit; and a control terminal of the frequency modulation control circuit is coupled to a corresponding frequency modulation control line, and a second terminal of the frequency modulation control circuit is coupled to a corresponding storage electrode; and the frequency modulation control circuit is configured to electrically connect the data writing circuit and the storage electrode coupled to the frequency modulation control circuit in response to a signal on the corresponding frequency modulation control line coupled to the frequency modulation control circuit.

In some examples, the data writing circuit includes a data writing transistor; a gate electrode of the data writing transistor is used as the control terminal of the data writing circuit, a first electrode of the data writing transistor is used as the first terminal of the data writing circuit, and a second electrode of the data writing transistor is used as the second terminal of the data writing circuit.

In some examples, the frequency modulation control circuit includes a frequency modulation control transistor; a gate electrode of the frequency modulation control transistor is used as the control terminal of the frequency modulation control circuit, a first electrode of the frequency modulation control transistor is used as the first terminal of the frequency modulation control circuit, and a second electrode of the frequency modulation control transistor is used as the second terminal of the frequency modulation control circuit.

A display apparatus according to the embodiment of the present disclosure includes: the above driving circuit for the display panel and/or the above display panel.

DETAIL DESCRIPTION OF EMBODIMENTS

Figure 1:
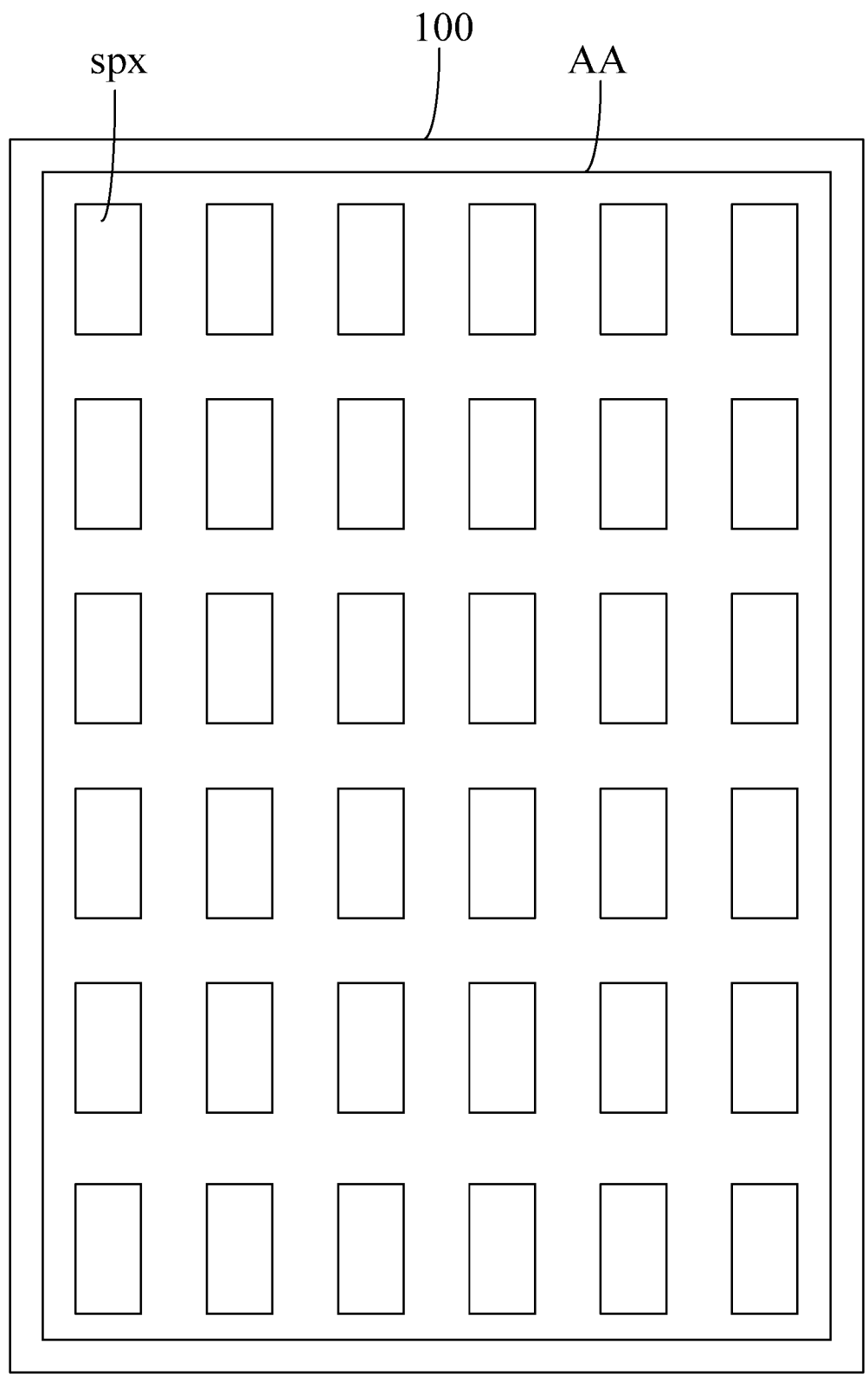
FIG. 1 is a schematic diagram of a part of a structure of a display panel according to an embodiment of the present disclosure.

In order to make objects, technical solutions and advantages of the embodiments of the present disclosure more apparent, the technical solutions of the embodiments of the present disclosure will be clearly and completely described below with reference to drawings of the embodiments of the present disclosure. Obviously, the described embodiments are only a few, not all, embodiments of the present disclosure. The embodiments and features of the embodiments in the present disclosure may be combined with each other without conflict. All other embodiments, which can be derived by a person skilled in the art from the described embodiments of the present disclosure without inventive steps, are intended to be within the scope of protection of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. The term "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections.

It should be noted that dimensions and shapes of various elements in the drawings are not to scale and are merely intended to illustrate the present disclosure. Like or similar reference numerals refer to like or similar elements or elements having like or similar functions throughout the description.

As shown in FIG. 1, a display panel may include: a display region AA. The display region AA may include a plurality of pixel units arranged in an array and provided therein. Each pixel unit may include a plurality of sub-pixels spx. For example, each pixel unit may include a red sub-pixel spx, a green sub-pixel spx, and a blue sub-pixel spx, so that a color mixing may be realized by the red sub-pixel spx, the green sub-pixel spx, and the blue sub-pixel spx, to achieve color display. Alternatively, each pixel unit may include a red sub-pixel spx, a green sub-pixel spx, a blue sub-pixel spx, and a white sub-pixel spx, so that the color mixing may be realized by the red sub-pixel spx, the green sub-pixel spx, the blue sub-pixel spx and the white sub-pixel spx, to achieve color display. Alternatively, in a practical application, a light emitting color of the sub-pixels spx in each pixel unit may be determined according to an environment of the practical application, and is not limited herein.

In a practical application, a fixed refresh frequency is generally used in the display panel in the display apparatus to refresh data of the sub-pixels spx in the display region AA row by row, so that the display panel displays an image. The refresh frequency is fixed, so that the fixed refresh frequency easily causes a poor visual effect of a screen display with high requirements on a display image quality; and easily causes a waste of power consumption with low requirements on the display image quality.

Figure 2A:
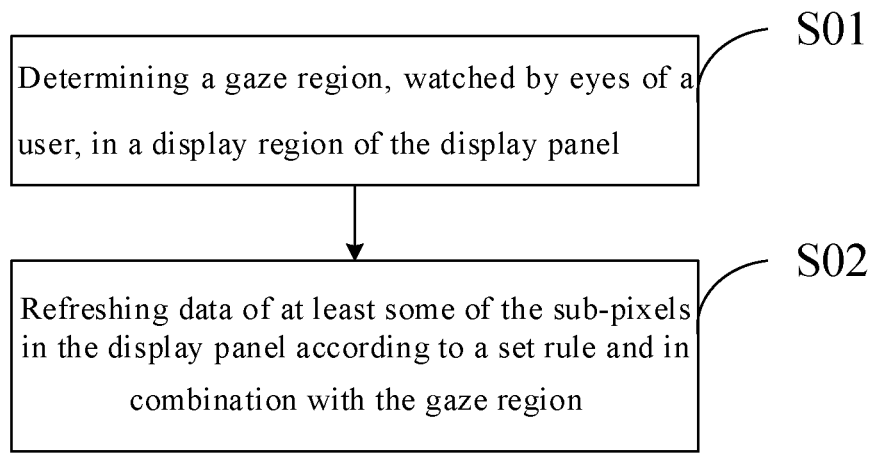
FIG. 2a is a flow chart of a driving method according to an embodiment of the present disclosure.

The driving method for a display panel according to the embodiment of the present disclosure, as shown in FIG. 2a, may include the following steps:

S01, determining a gaze region, watched by eyes of a user, in a display region of the display panel;

S02, refreshing data of at least some of the sub-pixels in the display panel according to a set rule and in combination with the gaze region.

In some examples, determining a gaze region, watched by eyes of a user, in a display region of the display panel may specifically include: determining the gaze region, watched by eyes of the user, in the display region of the display panel within K display frames of a refresh cycle.

In some examples, refreshing data of at least some of the sub-pixels in the display panel according to a set rule and in combination with the gaze region may specifically include: in the refresh cycle, refreshing data of the sub-pixels in the gaze region by adopting a first refresh frequency, and refreshing data of the sub-pixels in a non-gaze region except the gaze region by adopting a second refresh frequency; wherein the first refresh frequency is different from the second refresh frequency.

Figure 2B:
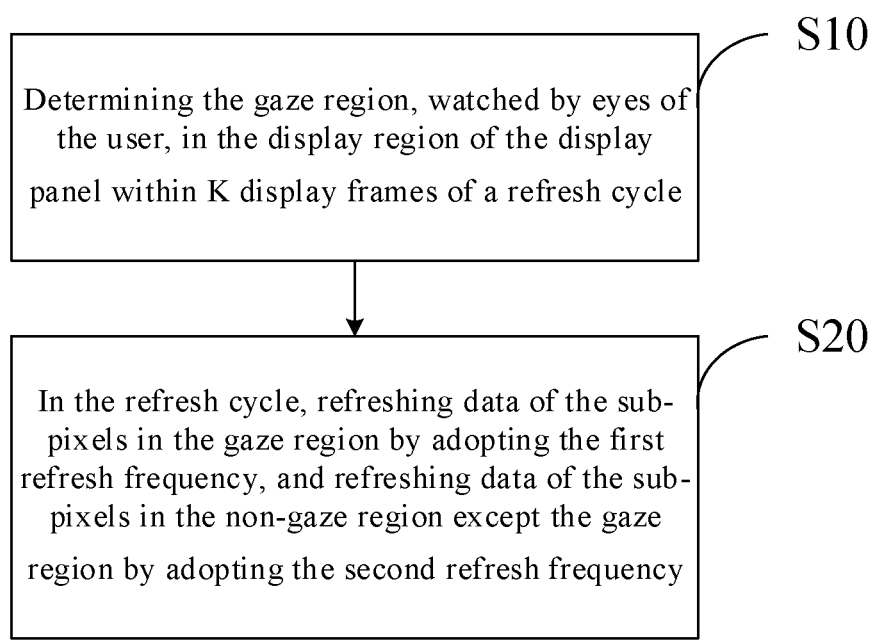
FIG. 2b is a flow chart of a driving method according to an embodiment of the present disclosure.

In some examples, the driving method for the display panel according to the embodiment of the present disclosure, as shown in FIG. 2b, may include the following steps:

S10, determining the gaze region, watched by eyes of the user, in the display region of the display panel within K display frames of a refresh cycle.

For example, each refresh cycle in step S10 may include M consecutive display frames. M may be an integer greater than 1, and K may be an integer greater than 0. For example, K<M. Alternatively, K=M, which is not limited herein.

In a practical application, the display panel, for example, when displaying video images, may employ a plurality of display frames to display the video images. The plurality of display frames for displaying the video images may be divided into a plurality of refresh cycles. For example, M=2, K=1. Every two adjacent display frames may be used as one refresh cycle. For example, when ten display frames are used to display video images, a first display frame and a second display frame may be used as a first refresh cycle, and then one display frame may be selected in the first refresh cycle, to determine, in the one display frame, the gaze region, watched by eyes of the user, in the display region AA of the display panel.

A third display frame and a fourth display frame may be used as a second refresh cycle, and then one display frame may be selected in the second refresh cycle, to determine, in the one display frame, the gaze region, watched by eyes of the user, in the display region AA of the display panel.

A fifth display frame and a sixth display frame may be used as a third refresh cycle, and then one display frame may be selected in the third refresh cycle, to determine, in the one display frame, the gaze region, watched by eyes of the user, in the display region AA of the display panel.

A seventh display frame and an eighth display frame may be used as a fourth refresh cycle, and then one display frame may be selected in the fourth refresh cycle, determine, in the one display frame, the gaze region, watched by eyes of the user, in the display region AA of the display panel.

A ninth display frame and a tenth display frame may be used as a fifth refresh cycle, and then one display frame may be selected in the fifth refresh cycle, to determine, in the one display frame, the gaze region, watched by eyes of the user, in the display region AA of the display panel.

For example, M=3, K=1 or K=2. Every three adjacent display frames may be used as one refresh cycle. For example, when twelve display frames are used to display video images, a first display frame to a third display frame may be used as a first refresh cycle, and then one display frame may be selected in the first refresh cycle, to determine, in the one display frame, the gaze region, watched by eyes of the user, in the display region AA of the display panel. Alternatively, two display frames may be selected in the first refresh cycle, so as to determine, in the two display frames, the gaze region, watched by eyes of the user, in the display region AA of the display panel.

A fourth display frame to a sixth display frame may be used as a second refresh cycle, and then one display frame may be selected in the second refresh cycle, so as to determine, in the one display frame, the gaze region, watched by eyes of the user, in the display region AA of the display panel. Alternatively, two display frames may be selected in the second refresh cycle, so as to determine, in the two display frames, the gaze region, watched by eyes of the user, in the display region AA of the display panel.

A seventh display frame to a ninth display frame may be used as a third refresh cycle, and then one display frame may be selected in the third refresh cycle, so as to determine, in the one display frame, the gaze region, watched by eyes of the user, in the display region AA of the display panel. Alternatively, two display frames may be selected in the third refresh cycle, so as to determine, in the two display frames, the gaze region, watched by eyes of the user, in the display region AA of the display panel.

A tenth display frame to a twelfth display frame may be used as a fourth refresh cycle, and then one display frame may be selected in the fourth refresh cycle, so as to determine, in the one display frame, the gaze region, watched by eyes of the user, in the display region AA of the display panel. Alternatively, two display frames may be selected in the fourth refresh cycle, so as to determine, in the two display frames, the gaze region, watched by eyes of the user, in the display region AA of the display panel.

For example, N=4, K=1, K=2, or K=3. Every four adjacent display frames may be used as one refresh cycle. For example, when 16 display frames are used to display video images, a first display frame to a fourth display frame may be used as a first refresh cycle, and then one display frame may be selected in the first refresh cycle, so as to determine, in the one display frame, the gaze region, watched by eyes of the user, in the display region AA of the display panel. Alternatively, two display frames may be selected in the first refresh cycle, so as to determine, in the two display frames, the gaze region, watched by eyes of the user, in the display region AA of the display panel. Alternatively, three display frames may be selected in the first refresh cycle, so as to determine, in the three display frames, the gaze region, watched by eyes of the user, in the display region AA of the display panel.

A fifth display frame to an eighth display frame may be used as a second refresh cycle, and then one display frame may be selected in the second refresh cycle, so as to determine, in the one display frame, the gaze region, watched by eyes of the user, in the display region AA of the display panel. Alternatively, two display frames may be selected in the second refresh cycle, so as to determine, in the two display frames, the gaze region, watched by eyes of the user, in the display region AA of the display panel. Alternatively, three display frames may be selected in the second refresh cycle, so as to determine, in the three display frames, the gaze region, watched by eyes of the user, in the display region AA of the display panel.

A ninth display frame to a twelfth display frame may be used as a third refresh cycle, and then one display frame may be selected in the third refresh cycle, so as to determine, in the one display frame, the gaze region, watched by eyes of the user, in the display region AA of the display panel. Alternatively, two display frames may be selected in the third refresh cycle, so as to determine, in the two display frames, the gaze region, watched by eyes of the user, in the display region AA of the display panel. Alternatively, three display frames may be selected in the third refresh cycle, so as to determine, in the three display frames, the gaze region, watched by eyes of the user, in the display region AA of the display panel.

A thirteenth display frame to a sixteenth display frame may be used as a fourth refresh cycle, and then one display frame may be selected in the fourth refresh cycle, so as to determine, in the one display frame, the gaze region, watched by eyes of the user, in the display region AA of the display panel. Alternatively, two display frames may be selected in the fourth refresh cycle, so as to determine, in the two display frames, the gaze region, watched by eyes of the user, in the display region AA of the display panel. Alternatively, three display frames may be selected in the fourth refresh cycle, so as to determine, in the three display frames, the gaze region, watched by eyes of the user, in the display region AA of the display panel.

Similarly, other conditions may be analogized, and are not described herein again.

Figure 3:
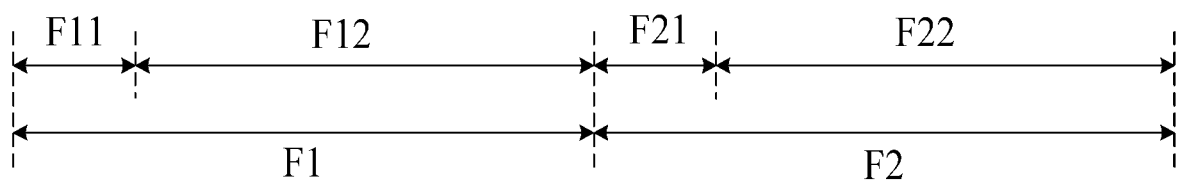
FIG. 3 is a schematic diagram of a first display frame and a second display frame according to an embodiment of the present disclosure.

A display frame may have a data refresh period and a blanking time period. In the data refresh period, data of the sub-pixels spx in the display panel may be refreshed. In the blanking time period (e.g., a field blanking time period), instead of refreshing data of the sub-pixels spx in the display panel, other operations may be performed (e.g., returning from a bottom right corner to a top left corner of an image to start scanning in a new display frame). For example, as shown in FIG. 3, the first display frame F1 may have a data refresh period F12 and a blanking time period F11. The second display frame F2 may have a data refresh period F22 and a blanking time period F21. In the first display frame F1, the blanking time period F11 may be started, followed by the data refresh period F12. Similarly, in the second display frame F2, the blanking time period F21 may be started, followed by the data refresh period F22. In some examples, the gaze region, watched by eyes of the user, in the display region AA of the display panel may be determined in a blanking time period in a selected display frame. For example, when the first display frame F1 is selected, the gaze region, watched by eyes of the user, in the display region AA of the display panel may be determined in the blanking time period F11. Alternatively, when the second display frame F2 is selected, the gaze region, watched by eyes of the user, in the display region AA of the display panel may be determined in the blanking time period F21.

Figure 4:
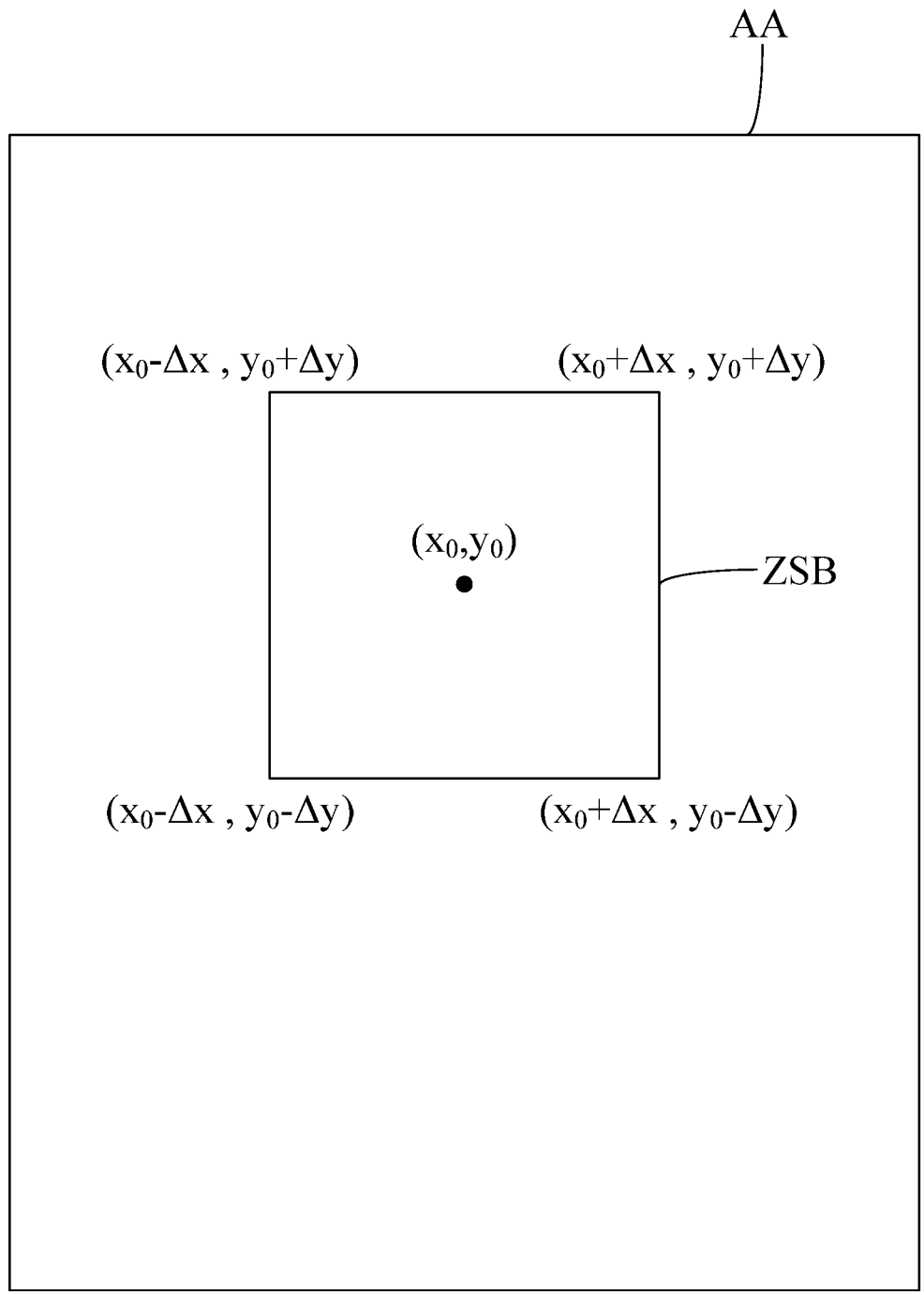
FIG. 4 is a schematic diagram of a gaze region according to an embodiment of the present disclosure.

For example, the gaze region may be rectangular. For example, as shown in FIG. 4, a coordinate $(x_0, y_0)$ of a gaze point, watched by eyes of the user, in the display region AA of the display panel may be determined by using the visual tracking technology. Then, $x_0 \pm \Delta x$ is obtained by expanding the abscissa $x_0$ in the coordinate of the gaze point, and $y_0 \pm \Delta y$ is obtained by expanding the ordinate $y_0$ in the coordinate of the gaze point. A specific position of the gaze region in the display region AA is determined by using $(x_0-\Delta x, y_0-\Delta y)$, $(x_0-\Delta x, y_0+\Delta y)$, $(x_0+\Delta x, y_0+\Delta y)$, $(x_0+\Delta x, y_0-\Delta y)$ as coordinates of four vertex angles of the gaze region. It should be noted that $\Delta x$ and $\Delta y$ may be determined according to requirements of the practical application, and are not limited herein.

Alternatively, the gaze region may have another shape, such as a circle with the coordinate $(x_0, y_0)$ of the gaze point as the center and $\Delta z$ as the radius, or a polygon.

S20, in the refresh cycle, refreshing data of the sub-pixels in the gaze region by adopting the first refresh frequency, and refreshing data of the sub-pixels in the non-gaze region except the gaze region by adopting the second refresh frequency; wherein the first refresh frequency is different from the second refresh frequency.

According to the driving method of the embodiment of the present disclosure, data of the sub-pixels spx in the gaze region is refreshed by adopting the first refresh frequency, and data of the sub-pixels spx in the non-gaze region is refreshed by adopting the second refresh frequency different from the first refresh frequency. In this way, the display region AA may be partitioned into a plurality of sub-regions, and different refresh frequencies are used for different sub-regions, so as to display an image. Therefore, the gaze region and the non-gaze region may be refreshed independently, and the refresh frequencies of different regions may be freely controlled.

When the display panel displays an image, due to the focusing effect of eyes, the eyes can focus on a part of the image in the gaze region, namely, the part of the image in the gaze region can be clearly watched. The entire display region AA cannot be focused entirely, i.e., a part of the image in the non-gaze region cannot be clearly watched. Therefore, the quality of the part of the image in the non-gaze region has a low contribution to the definition of the image watched by eyes. Therefore, data for the gaze region may be refreshed by adopting a higher refresh frequency, and data for the non-gaze region except the gaze region may be refreshed by adopting a lower refresh frequency. That is, the second refresh frequency is lower than the first refresh frequency. Therefore, data for the gaze region may be refreshed by adopting the higher refresh frequency, so that the human eyes may focus on and watch the image with a higher image quality. Data for the non-gaze region may be refreshed by adopting the lower refresh frequency, so that the power consumption of the display panel can be reduced. Alternatively, the second refresh frequency may be greater than the first refresh frequency, which is not limited herein.

In some examples, the second refresh frequency may be $(M-K)/M$ times of the first refresh frequency; where $K<M$. For example, $M=2$ and $K=1$. The second refresh frequency may be $\frac{1}{2}$ of the first refresh frequency. For example, the first refresh frequency is 60 Hz and the second refresh frequency is 30 Hz. Alternatively, $M=3$, $K=2$. The second refresh frequency may be $\frac{1}{3}$ of the first refresh frequency. For example, the first refresh frequency is 60 Hz and the second refresh frequency is 20 Hz. Alternatively, $M=3$ and $K=1$. The second refresh frequency may be $\frac{2}{3}$ of the first refresh frequency. For example, the first refresh frequency is 60 Hz and the second refresh frequency is 40 Hz. Alternatively, $M=4$ and $K=3$. The second refresh frequency may be $\frac{1}{4}$ of the first refresh frequency. For example, the first refresh frequency is 60 Hz and the second refresh frequency is 15 Hz. Alternatively, $M=4$, $K=2$. The second refresh frequency may be $\frac{2}{4}$ of the first refresh frequency. For example, the first refresh frequency is 60 Hz and the second refresh frequency is 30 Hz. Alternatively, $M=4$ and $K=1$. The second refresh frequency may be $\frac{3}{4}$ of the first refresh frequency. For example, the first refresh frequency is 60 Hz and the second refresh frequency is 45 Hz.

Alternatively, in a practical application, specific values of the first refresh frequency and the second refresh frequency may be specifically determined according to requirements of the practical application, and are not limited herein.

In some examples, the step S20, refreshing data of the sub-pixels in the gaze region by adopting the first refresh frequency, and refreshing data of the sub-pixels in the non-gaze region except the gaze region by adopting the second refresh frequency, may specifically include: only refreshing data for the gaze region in the K display frames; and refreshing data of the sub-pixels in the gaze region and the non-gaze region in display frames except the K display frames in the refresh cycle. For example, when $M=2$ and $K=1$, that is, the refresh cycle includes two display frames, only data for the gaze region may be refreshed in one of the two display frames; and data of the sub-pixels in the gaze region and the non-gaze region is refreshed in the other display frame. When $M=3$ and $K=1$, that is, the refresh cycle includes three display frames, only data for the gaze region may be refreshed in one of the three display frames; and data of the sub-pixels in the gaze region and the non-gaze region is refreshed in the other two display frames. When $M=3$ and $K=2$, that is, the refresh cycle includes three display frames, only data for the gaze region may be refreshed in two of the three display frames; and data of the sub-pixels in the gaze region and the non-gaze region is refreshed in the other display frame. When $M=4$ and $K=1$, that is, the refresh cycle includes fourth display frames, only data for the gaze region may be refreshed in one of the fourth display frames; and data of the sub-pixels in the gaze region and the non-gaze region is refreshed in the other three display frames. When $M=4$ and $K=2$, that is, the refresh cycle includes fourth display frames, only data for the gaze region may be refreshed in two of the fourth display frames; and data of the sub-pixels in the gaze region and the non-gaze region is refreshed in the other two display frames. When $M=4$ and $K=3$, that is, the refresh cycle includes fourth display frames, only data for the gaze region may be refreshed in three of the fourth display frames; and data of the sub-pixels in the gaze region and the non-gaze region is refreshed in the other display frame.

In some examples, when $M=2$, each refresh cycle includes two display frames. In particular implementations, the gaze region, watched by eyes of the user, in the display region of the display panel may be determined within each odd number of the display frames of the refresh cycle. For example, when a first display frame and a second display frame are used as a first refresh cycle, the gaze region, watched by eyes of the user, in the display region of the display panel may be determined within the first display frame. When a third display frame and a fourth display frame are used as a second refresh cycle, the gaze region, watched by eyes of the user, in the display region of the display panel may be determined within the third display frame. When a fifth display frame and a sixth display frame are used as a third refresh cycle, the gaze region, watched by eyes of the user, in the display region of the display panel may be determined within the fifth display frame. When a seventh display frame and an eighth display frame are used as a fourth refresh cycle, the gaze region, watched by eyes of the user, in the display region of the display panel may be determined within the seventh display frame. When a ninth display frame and a tenth display frame are used as a fifth refresh cycle, the gaze region, watched by eyes of the user, in the display region of the display panel may be determined within the ninth display frame.

In some examples, only refreshing data for the gaze region in the K display frames; and refreshing data of the sub-pixels in the gaze region and the non-gaze region in display frames except the K display frames in the refresh cycle, may specifically include: only refreshing data for the gaze region within each odd number of the display frames of the refresh cycle; and refreshing data of the sub-pixels in the gaze region and the non-gaze region in each even number of the display frames of the refresh cycle.

For example, when a first display frame and a second display frame are used as a first refresh cycle, only data for the gaze region may be refreshed in the first display frame, and data of the sub-pixels in the gaze region and the non-gaze region may be refreshed in the second display frame. When a third display frame and a fourth display frame are used as a second refresh cycle, only data for the gaze region may be refreshed in the third display frame, and data of the sub-pixels in the gaze region and the non-gaze region may be refreshed in the fourth display frame. When a fifth display frame and a sixth display frame are used as a third refresh cycle, only data for the gaze region may be refreshed in the fifth display frame, and data of the sub-pixels in the gaze region and the non-gaze region may be refreshed in the sixth display frame. When a seventh display frame and an eighth display frame are used as a fourth refresh cycle, only data for the gaze region may be refreshed in the seventh display frame, and data of the sub-pixels in the gaze region and the non-gaze region may be refreshed in the eighth display frame. When a ninth display frame and a tenth display frame are used as a fifth refresh cycle, only data for the gaze region may be refreshed in the ninth display frame, and data of the sub-pixels in the gaze region and the non-gaze region may be refreshed in the tenth display frame.

Figure 5:
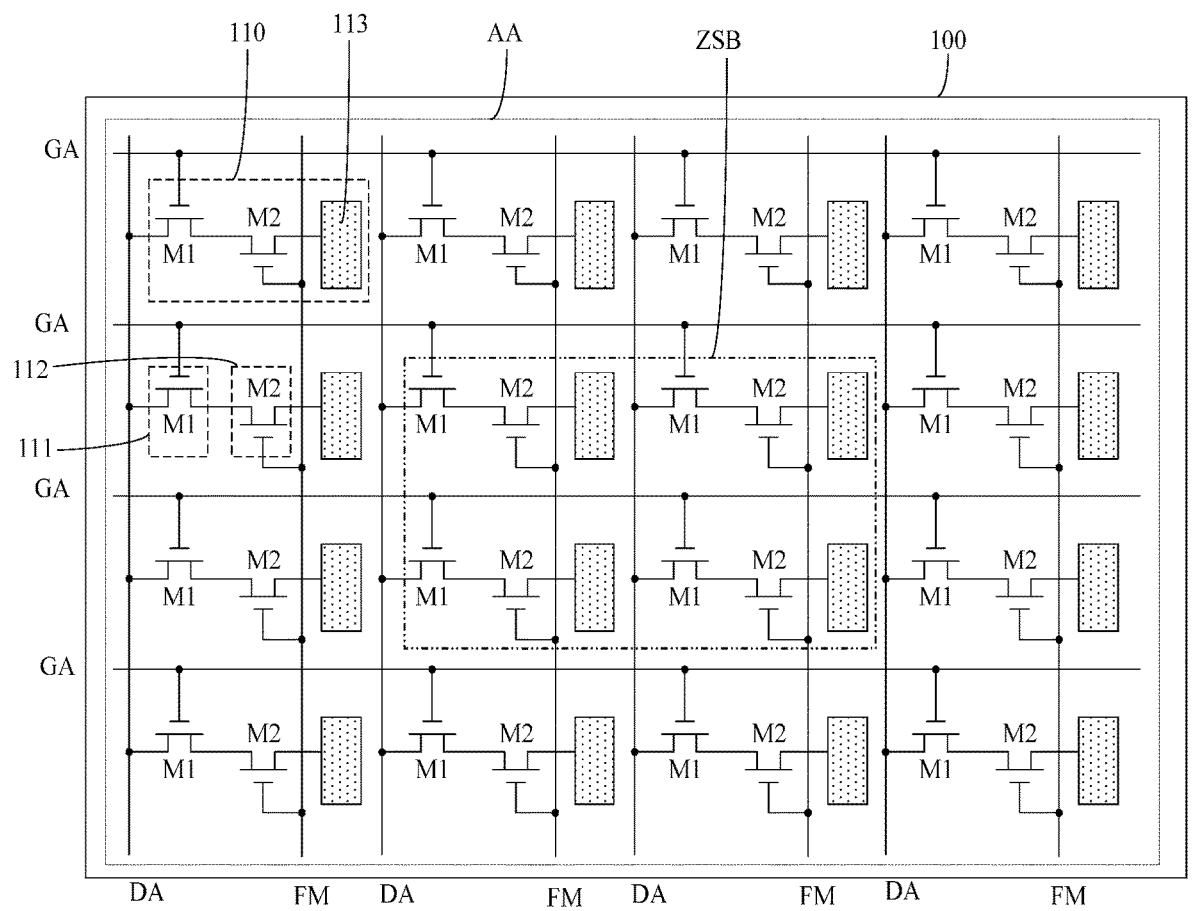
FIG. 5 is a schematic diagram of a part of another structure of a display panel according to an embodiment of the present disclosure.

In some examples, the display panel according to the embodiments of the present disclosure, as shown in FIG. 5, includes a base substrate 100; the display region AA includes the plurality of pixel units spx provided therein. The display panel further includes a plurality of scanning lines GA, a plurality of data lines DA, and a plurality of frequency modulation control lines FM; wherein each row of sub-pixels spx corresponds to at least one of the plurality of scanning lines GA, and each column of sub-pixels spx corresponds to at least one of the plurality of data lines DA and at least one of the plurality of frequency modulation control lines FM. For example, each row of sub-pixels spx corresponds to one of the plurality of scanning lines GA, and each column of sub-pixels spx corresponds to one of the plurality of data lines DA, and one of the plurality of frequency modulation control lines FM.

In some examples, each sub-pixel spx may include: a data writing circuit 111, a frequency modulation control circuit 112, and a storage electrode 113.

A control terminal of the data writing circuit 111 is coupled to a corresponding scanning line GA, a first terminal of the data writing circuit 111 is coupled to a corresponding data line DA, and a second terminal of the data writing circuit 111 is coupled to a first terminal of the frequency modulation control circuit 112; and the data writing circuit 111 is configured to electrically connect the corresponding data line DA and the frequency modulation control circuit 112 coupled to the data writing circuit 111 in response to a signal on the corresponding scanning line GA coupled to the data writing circuit 11.

A control terminal of the frequency modulation control circuit 112 is coupled to a corresponding frequency modulation control line FM, and a second terminal of the frequency modulation control circuit 112 is coupled to the storage electrode 113; and the frequency modulation control circuit 112 is configured to electrically connect the data writing circuit 111 and the storage electrode 113 coupled to the frequency modulation control circuit 112 in response to a signal on the corresponding frequency modulation control line FM coupled to the frequency modulation control circuit 112.

In the display panel according to the embodiment of the present disclosure, by providing the data writing circuit 111, the frequency modulation control circuit 112 and the storage electrode 113 in each sub-pixel spx, the data writing circuit 111 may electrically connect the corresponding data line DA and the frequency modulation control circuit 112 coupled to the data writing circuit 111 in response to the signal on the corresponding scanning line GA coupled to the data writing circuit 11; and the frequency modulation control circuit 112 may electrically connect the data writing circuit 111 and the storage electrode 113 coupled to the frequency modulation control circuit 112 in response to the signal on the corresponding frequency modulation control line FM coupled to the frequency modulation control circuit 112. The different sub-pixels spx can be independent controlled through signals input to the scanning lines GA and the frequency modulation control lines FM.

In some examples, in particular implementations, as shown in FIG. 5, the data writing circuit 111 may include: a data writing transistor M1; a gate electrode of the data writing transistor M1 is used as the control terminal of the data writing circuit 111, a first electrode of the data writing transistor M1 is used as the first terminal of the data writing circuit 111, and a second electrode of the data writing transistor M1 is used as the second terminal of the data writing circuit 111.

In some examples, in particular implementations, as shown in FIG. 5, the frequency modulation control circuit 112 may include: a frequency modulation control transistor M2; a gate electrode of the frequency modulation control transistor M2 is used as the control terminal of the frequency modulation control circuit 112, a first electrode of the frequency modulation control transistor M2 is used as the first terminal of the frequency modulation control circuit 112, and a second electrode of the frequency modulation control transistor M2 is used as the second terminal of the frequency modulation control circuit 112.

In some examples, as shown in FIG. 5, the data writing transistor M1 and the frequency modulation control transistor M2 may both be N-type transistors. The N-type transistor is turned on by a high level and turned off by a low level. Therefore, the data writing transistor M1 and the frequency modulation control transistor M2 are provided through a same process, so that the number of processes is reduced.

In some examples, the data writing transistor M1 and the frequency modulation control transistor M2 may also both be P-type transistors. The P-type transistor is turned on by a low level and turned off by a high level. Therefore, the data writing transistor M1 and the frequency modulation control transistor M2 are provided through a same process, so that the number of processes is reduced.

In some examples, the transistors mentioned in the above embodiments may be Metal Oxide semiconductor field effect transistors (MOSFETs) or Thin Film Transistors (TFTs). In a specific implementation, a first electrode of each of these transistors may serve as a source electrode and a second electrode of each of these transistors may serve as a drain electrode. Alternatively, the first electrode may be used as a drain electrode and the second electrode may be used as a source electrode, which is not specifically distinguished herein.

A Liquid Crystal Display (LCD) panel is thin, light, power-saving, radiationless and the like, and thus is widely applied. The operation principle of the LCD panel is in that arrangement of liquid crystal molecules in a liquid crystal layer is changed by changing a voltage difference across the liquid crystal layer, to change light transmittance of the liquid crystal layer, thereby displaying an image. In a specific implementation, the display panel according to the embodiment of the present disclosure may be the liquid crystal display panel. Specifically, the storage electrode 113 in each sub-pixel spx may be a pixel electrode on the array substrate. Thus, a data signal is input to the pixel electrode through the data line DA, that is, a voltage is input to the pixel electrode, thereby driving the liquid crystal molecules to rotate to display an image.

An electroluminescent diode, such as an Organic Light Emitting Diode (OLED), a Micro Light Emitting Diode (Micro-LED), or a Quantum Dot Light Emitting Diode (QLED) has advantages of self-luminescence, low-energy consumption and the like. In a specific implementation, the display panel provided in the embodiment of the present disclosure may be an electroluminescent display panel. In the embodiment of the present disclosure, each sub-pixel spx may include an electroluminescent diode and a pixel circuit for driving the electroluminescent diode to emit light. Also, the pixel circuit may include a plurality of transistors such as a driving transistor, a data writing transistor, a frequency modulation control transistor M2, and a storage capacitor. The storage electrode 113 in each sub-pixel spx in the embodiment of the present disclosure may be one plate of the storage capacitor (for example, the storage electrode 113 may be a plate of the storage capacitor electrically connected to agate electrode of the driving transistor).

In some examples, in a specific implementation, only refreshing data for the gaze region in each odd number of the display frames of the refresh cycle may specifically include: loading gate turn-on signals to the plurality of scanning lines row by row in each odd number of the display frames, so as to control the data writing circuits in the sub-pixels row by row to electrically connect the corresponding data lines and the frequency modulation control circuits coupled to the data writing circuits; loading frequency modulation turn-on signals on frequency modulation control lines corresponding to the sub-pixels in the gaze region and loading frequency modulation turn-off signals on frequency modulation control lines except the frequency modulation control lines corresponding to the sub-pixels in the gaze region when gate turn-on signals are loaded on scanning lines corresponding to sub-pixels in the gaze region, to control frequency modulation control circuits in the sub-pixels in the gaze region to electrically connect the data writing circuits and the storage electrodes coupled to the frequency modulation control circuits; and loading data signals to the data lines corresponding to the sub-pixels in the gaze region.

A gray scale means that a brightness region between a minimum brightness and a maximum brightness is generally divided into several parts, to facilitate control of a brightness of a screen. For example, a displayed image may generally be composed of three colors, that is, red, green, and blue, which are mixed together to form a color image, wherein each color may exhibit a brightness level, and the red, green, and blue colors of different brightness levels may be combined together to form different color dots. The gray scale represents a level of a brightness varying between the minimum brightness and the maximum brightness. The more the number of the levels is, the finer the presented image effect is. In the display panel, generally, a 6 bit ($2^6$ brightness levels, i.e. having 64 gray scales) panel, a 7 bit ($2^7$ brightness levels, i.e. having 128 gray scales) panel, an 8 bit ($2^8$ brightness levels, i.e. having 256 gray scales) panel, a 10 bit ($2^{10}$ brightness levels, i.e. having 1024 gray scales) panel, a 12 bit ($2^{12}$ brightness levels, i.e. having 4096 gray scales) panel, or a 16 bit ($2^{16}$ brightness levels, i.e. having 65536 gray scales) panel may be adopted to display the image. In the embodiment of the present disclosure, the data signal transmitted on the data line may be a voltage at a gray scale to be displayed by the sub-pixel. The image data may be a gray level corresponding to the sub-pixel.

In some examples, in a specific implementation, refreshing data of the sub-pixels in the gaze region and the non-gaze region in each even number of the display frames of the refresh cycle may specifically include: loading gate turn-on signals to the plurality of scanning lines row by row in each even number of display frames, so as to control the data writing circuits in the sub-pixels row by row to electrically connect the corresponding data lines and the frequency modulation control circuits coupled to the data writing circuits; loading frequency modulation turn-on signals to each frequency modulation control line, so as to control frequency modulation control circuits in the sub-pixels to electrically connect the data writing circuits and the storage electrodes coupled to the frequency modulation control circuits; and loading data signals to the data lines corresponding to the sub-pixels.

Figure 6A:
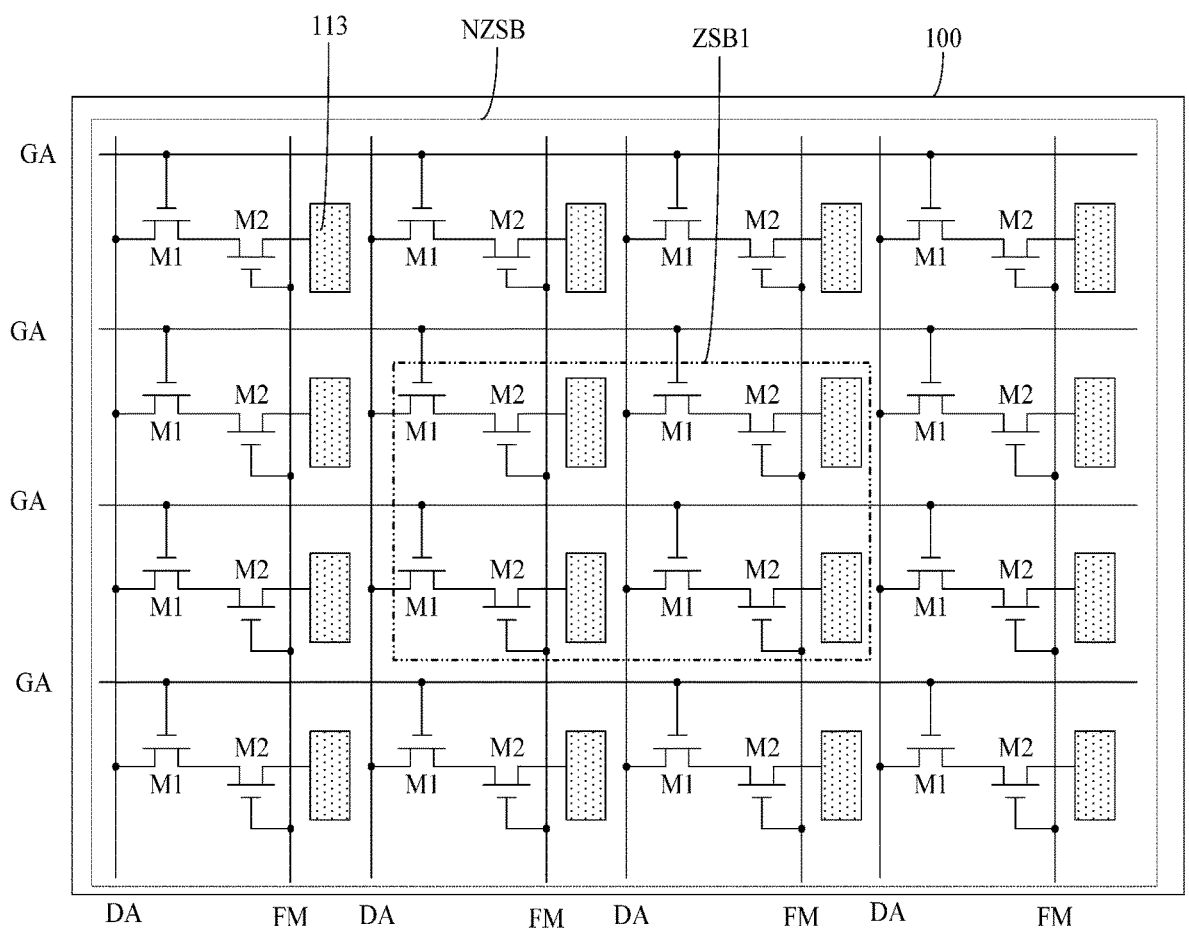
FIG. 6a is a schematic diagram of a part of another structure of a display panel according to an embodiment of the present disclosure.
Figure 6B:
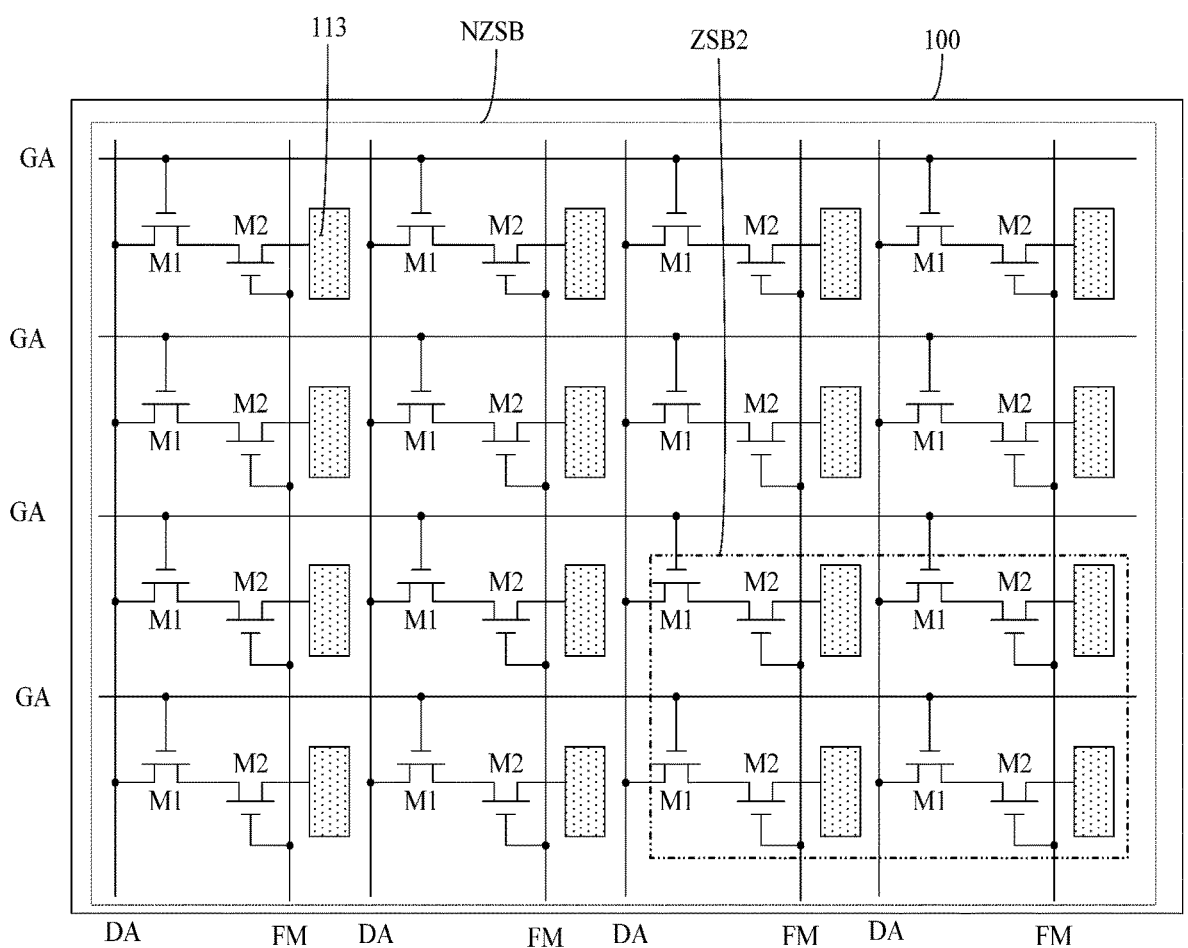
FIG. 6b is a schematic diagram of a part of another structure of a display panel according to an embodiment of the present disclosure.
Figure 7A:
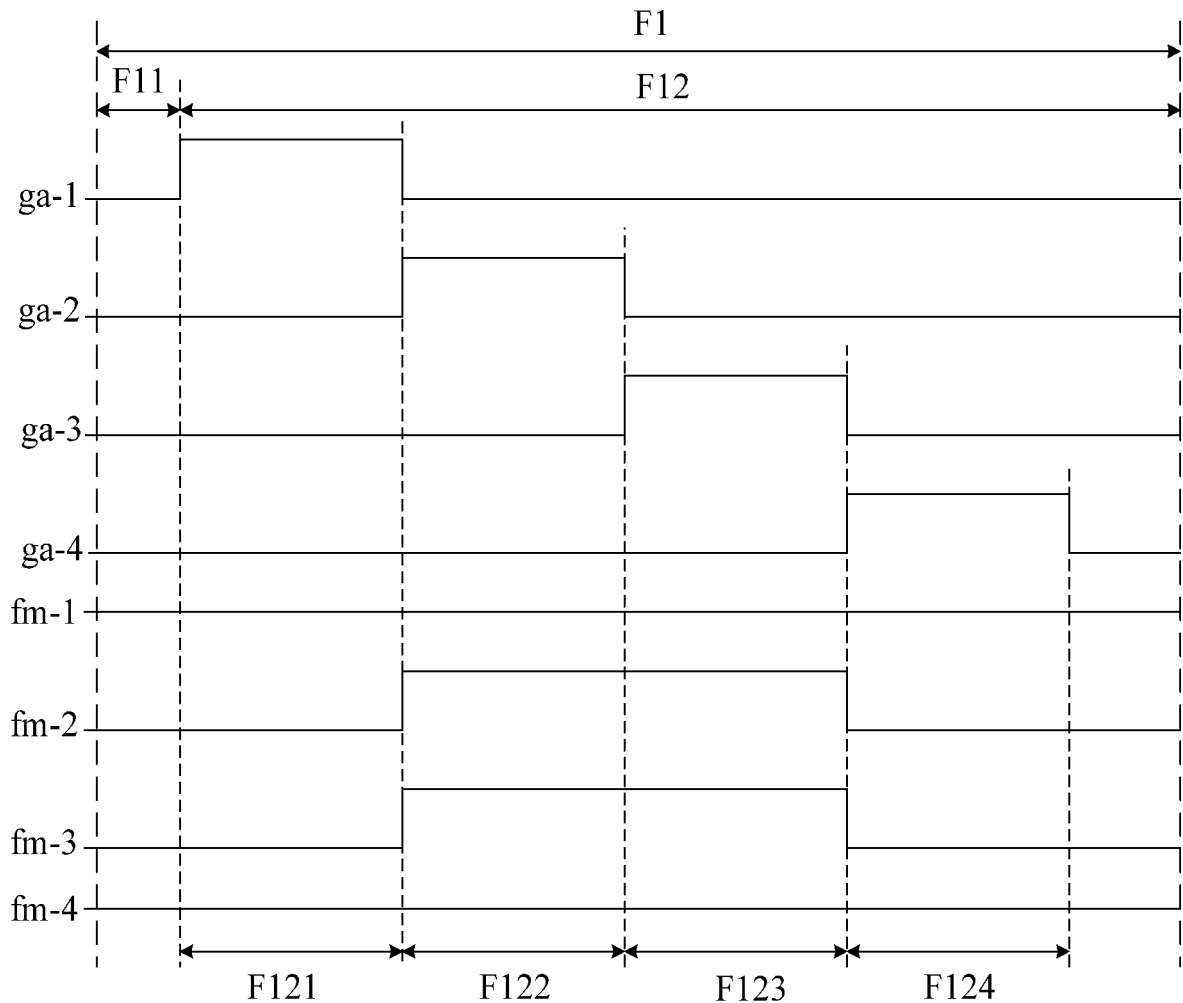
FIG. 7a is a timing diagram of signals for a first display frame according to an embodiment of the present disclosure.
Figure 7B:
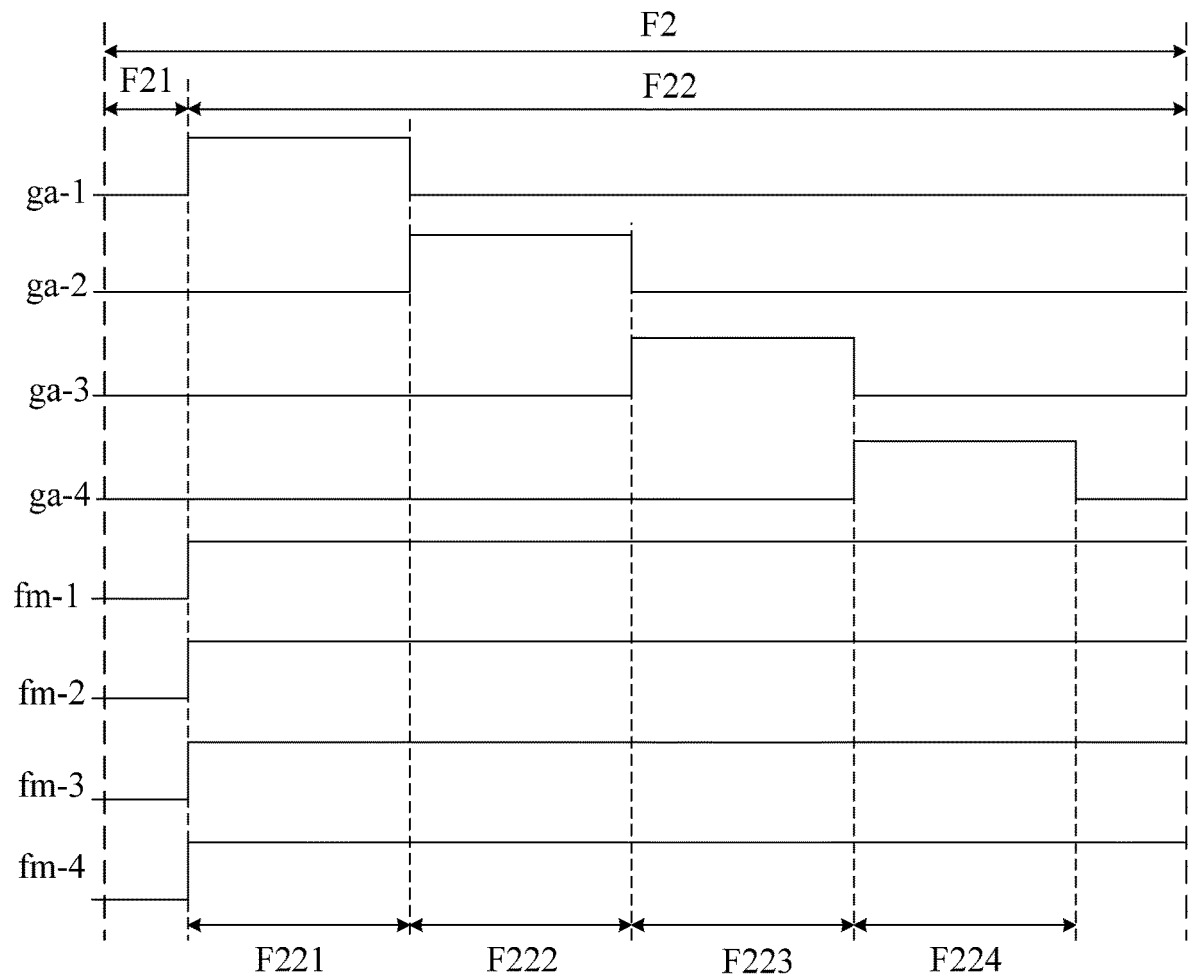
FIG. 7b is a timing diagram of signals for a second display frame according to an embodiment of the present disclosure.
Figure 7C:
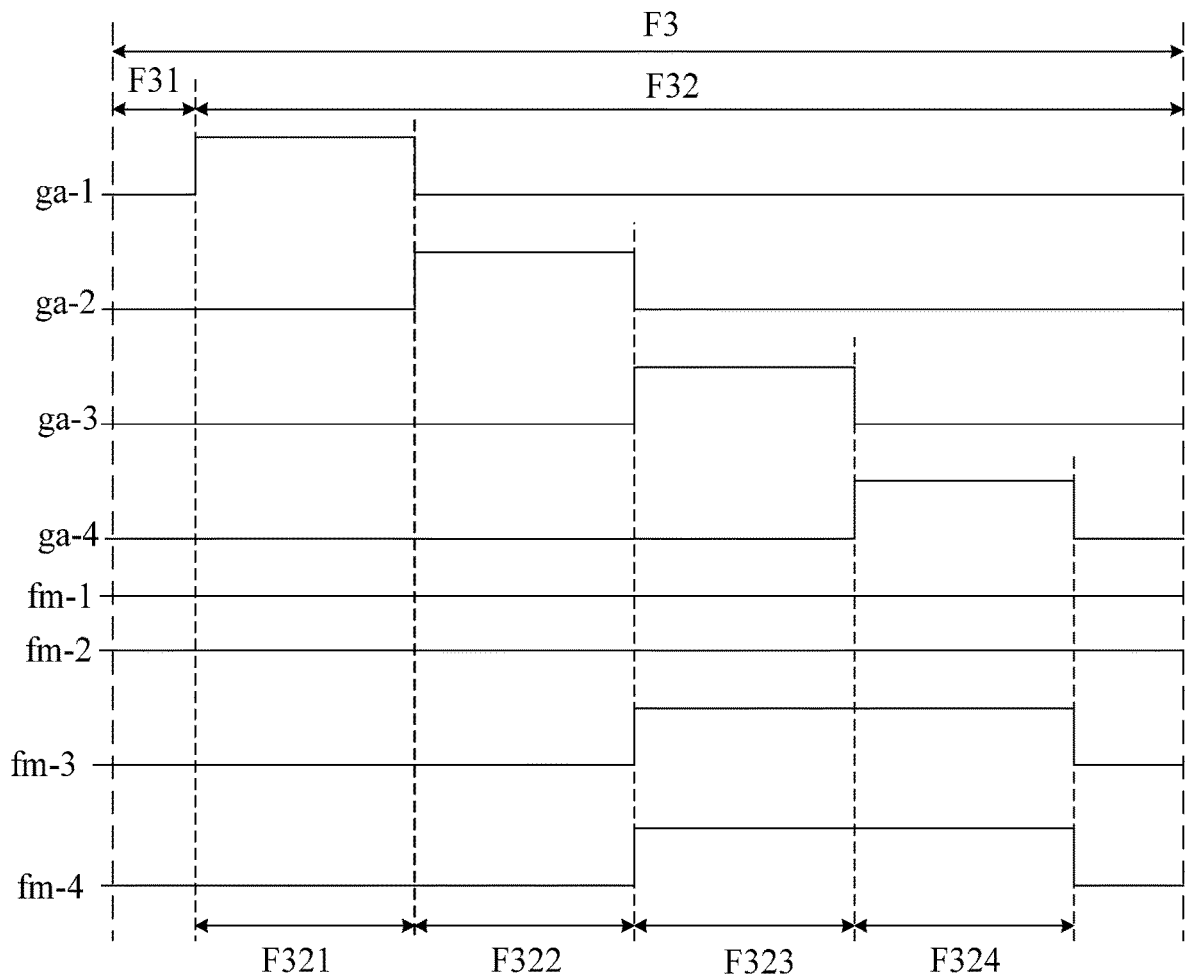
FIG. 7c is a timing diagram of signals for a third display frame according to an embodiment of the present disclosure.
Figure 7D:
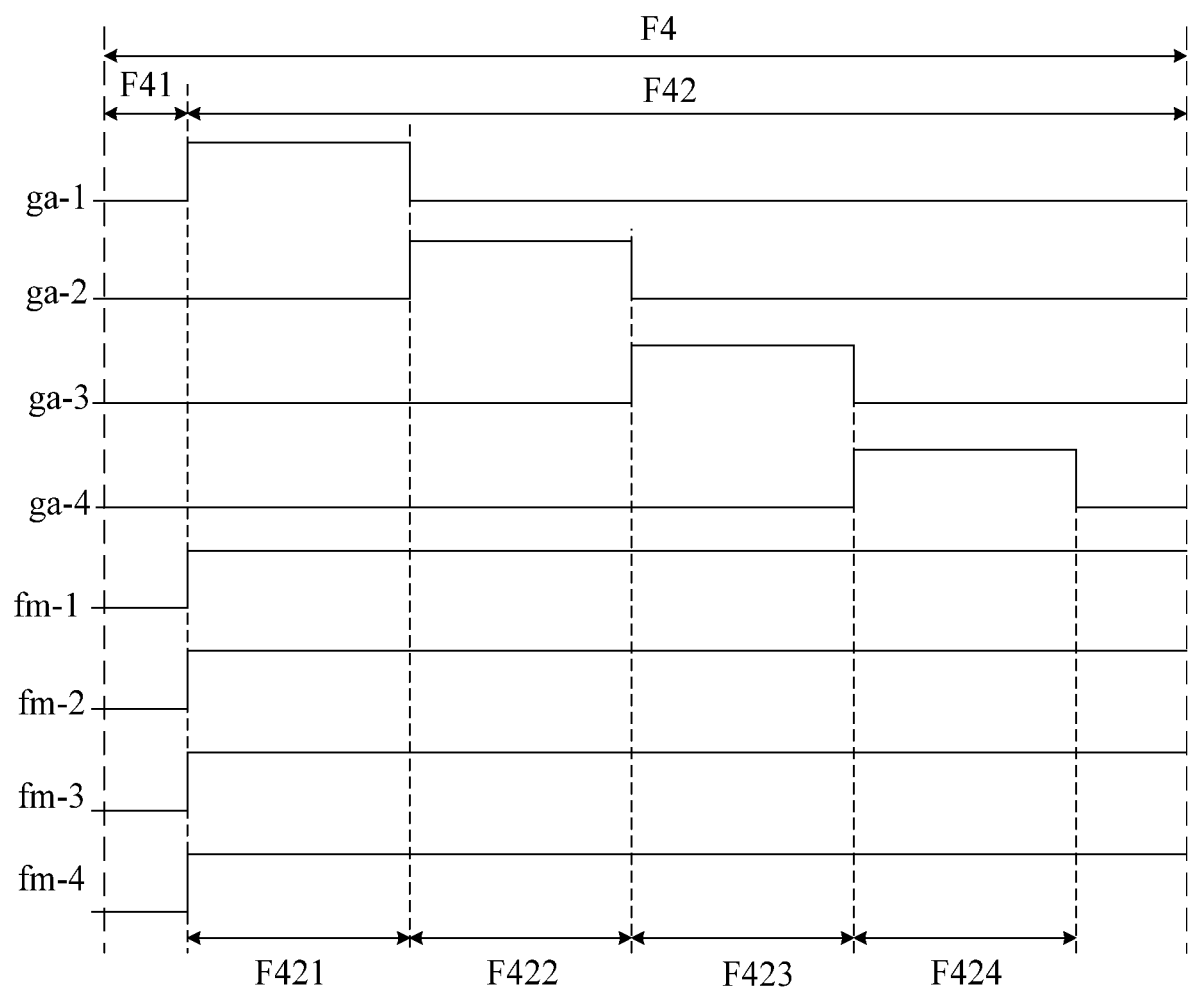
FIG. 7d is a timing diagram of signals for a fourth display frame according to an embodiment of the present disclosure.
Figure 8A:
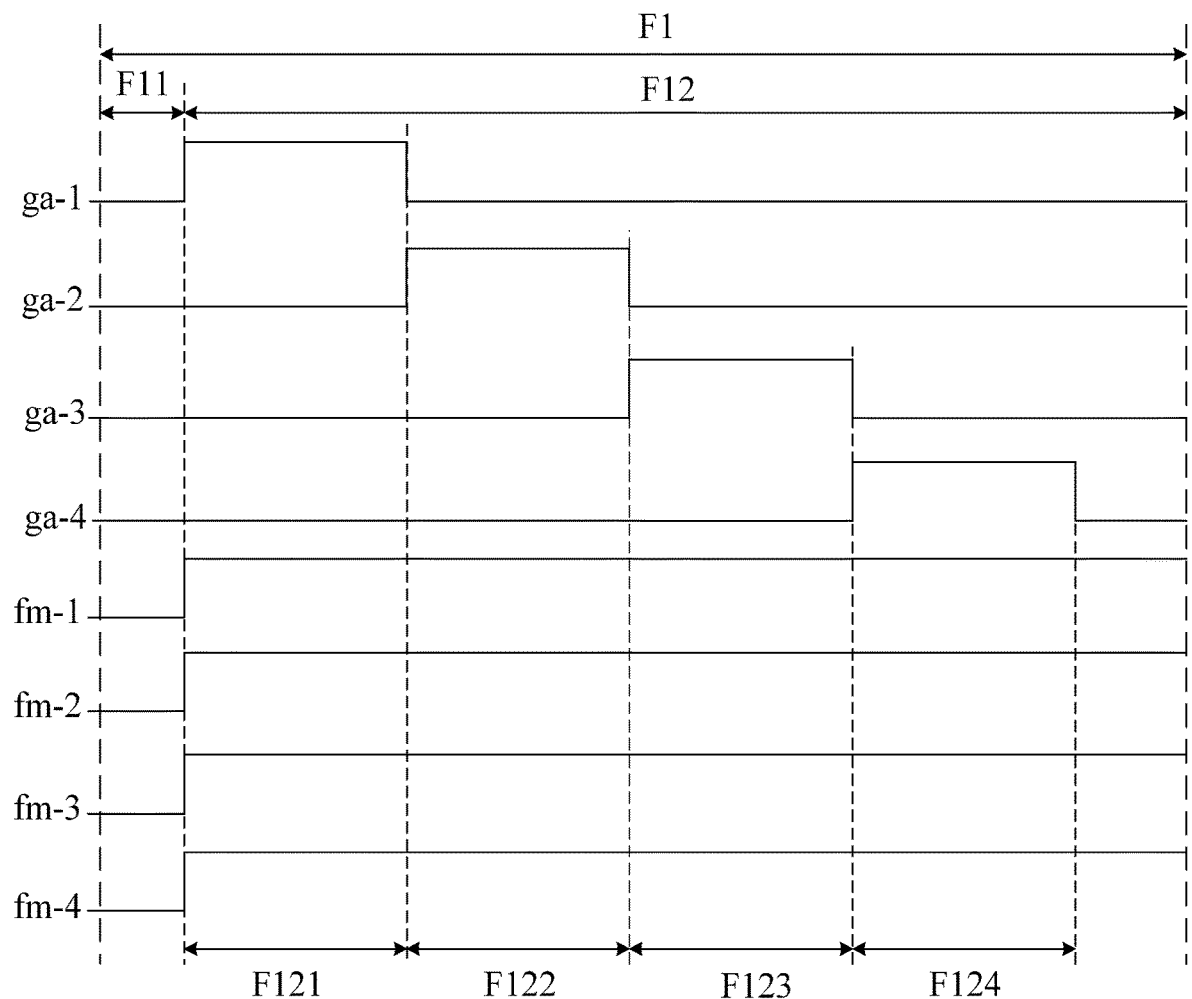
FIG. 8a is another timing diagram of signals for a first display frame according to an embodiment of the present disclosure.
Figure 8B:
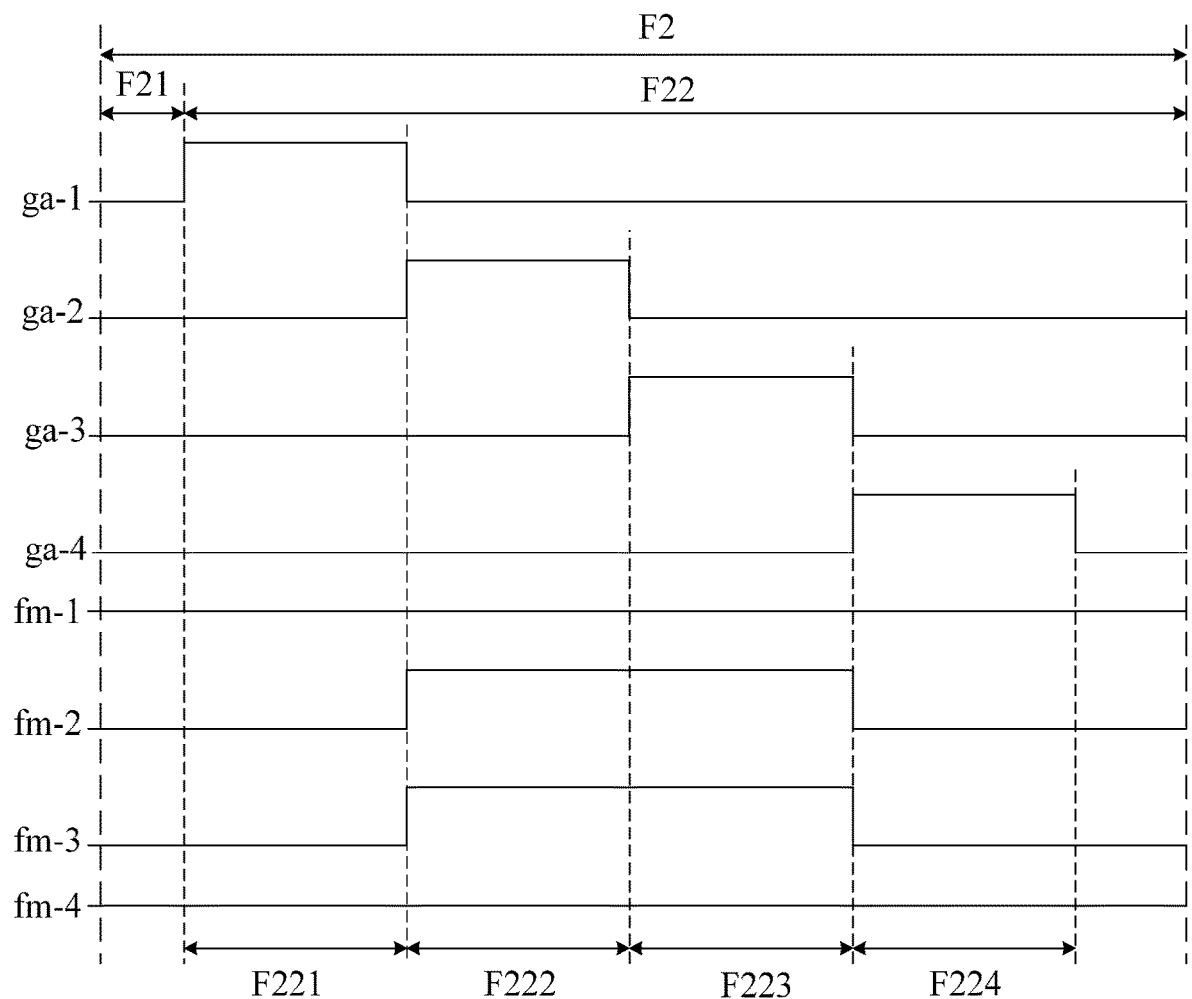
FIG. 8b is another timing diagram of signals for a second display frame according to an embodiment of the present disclosure.
Figure 8C:
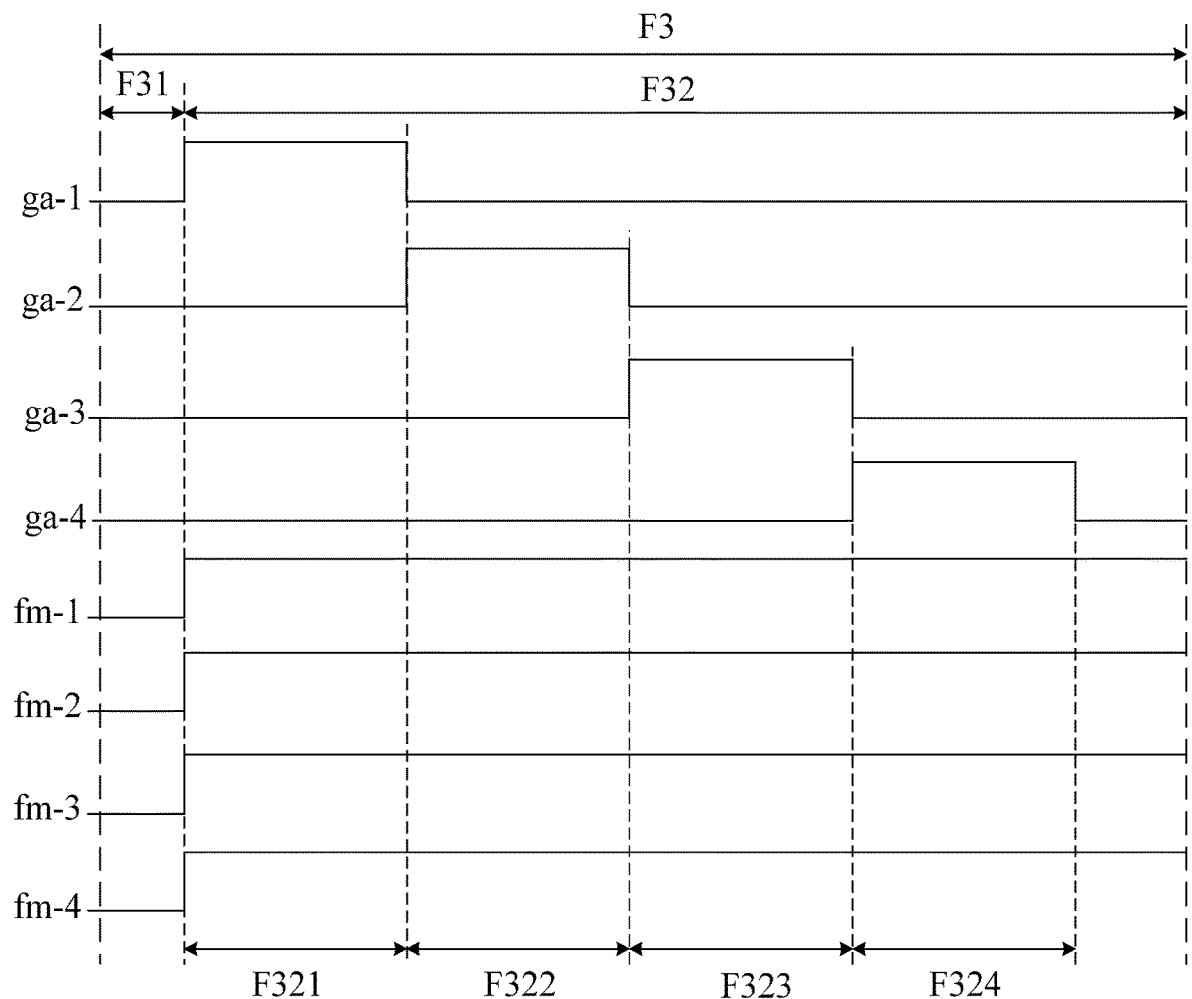
FIG. 8c is another timing diagram of signals for a third display frame according to an embodiment of the present disclosure.
Figure 8D:
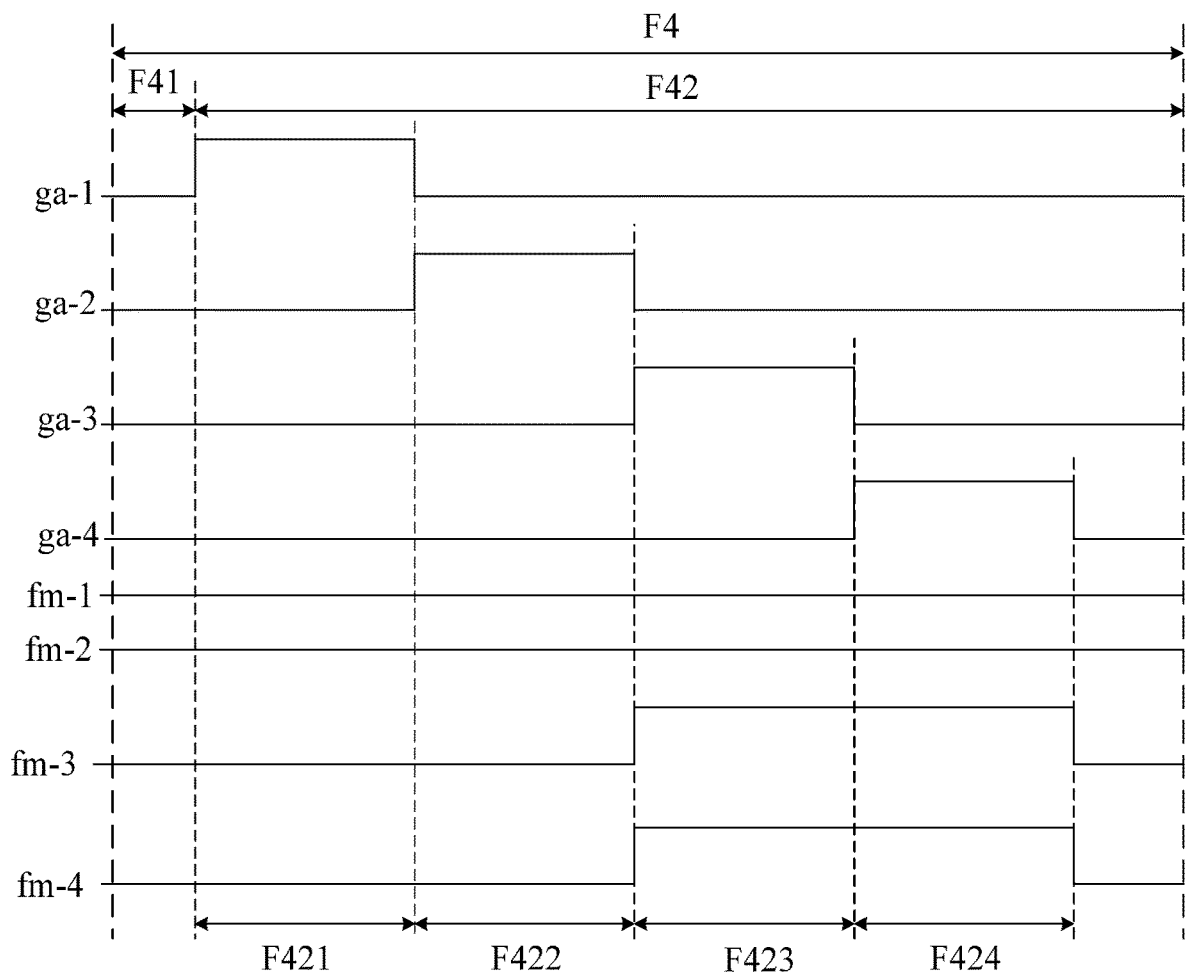
FIG. 8d is another timing diagram of signals for a fourth display frame according to an embodiment of the present disclosure.

The operation process of the driving method according to the embodiment of the present disclosure will be described below with reference to the display panels shown in FIGS. 6a and 6b and the timing diagrams of the signals shown in FIGS. 7a to 7d, by taking M=2 and the first to fourth display frames as an example.

F1 represents the first display frame, F11 represents the blanking time period in the first display frame, and F12 represents the data refresh period in the first display frame. F121 to F124 represent row scanning periods in the data refresh period in the first display frame.

F2 represents the second display frame, F21 represents the blanking time period in the second display frame, and F22 represents the data refresh period in the second display frame. F221 to F224 represent the row scanning periods in the data refresh period in the second display frame.

F3 represents the third display frame, F31 represents the blanking time period in the third display frame, and F32 represents the data refresh period in the third display frame. F321 to F324 represent the row scanning periods in the data refresh period in the third display frame.

F4 represents the fourth display frame, F41 represents the blanking time period in the fourth display frame, and F42 represents the data refresh period in the fourth display frame. F421 to F424 represent the row scanning periods in the data refresh period in the fourth display frame.

ga-1 represents a signal transmitted on a scanning line GA corresponding to a first row of sub-pixels spx, ga-2 represents a signal transmitted on a scanning line GA corresponding to a second row of sub-pixels spx, ga-3 represents a signal transmitted on a scanning line GA corresponding to a third row of sub-pixels spx, and ga-4 represents a signal transmitted on a scanning line GA corresponding to a fourth row of sub-pixels spx.

fm-1 represents a signal transmitted on a frequency modulation control line FM corresponding to a first column of sub-pixels spx, fm-2 represents a signal transmitted on a frequency modulation control line FM corresponding to a second column of sub-pixels spx, fm-3 represents a signal transmitted on a frequency modulation control line FM corresponding to a third column of sub-pixels spx, and fm-4 represents a signal transmitted on a frequency modulation control line FM corresponding to a fourth column of sub-pixels spx.

The driving method according to the embodiment of the present disclosure may include the following steps:

(1) In the blanking time period F11 in the first display frame, a coordinate $(x_0', y_0')$ of a gaze point, watched by eyes of the user, in the display region AA of the display panel may be determined by using the visual tracking technology. Then, $x_0' \pm \Delta x$ is obtained by expanding the abscissa $x_0'$ in the coordinate of the gaze point, and $y_0' \pm \Delta y$ is obtained by expanding the ordinate $y_0'$ in the coordinate of the gaze point. A specific position of the gaze region in the display region AA is determined by using $(x_0'-\Delta x, y_0'-\Delta y)$, $(x_0'-\Delta x, y_0'+\Delta y)$, $(x_0'+\Delta x, y_0'+\Delta y)$, $(x_0'+\Delta x, y_0'-\Delta y)$ as coordinates of four vertex angles of the gaze region. For example, the determined gaze region is the gaze region ZSB1 shown in FIG. 6a. The remaining region is the non-gaze region NZSB.

Some preparatory operations may be performed in the blanking time period F11, such as starting a scan of a new display frame from the bottom right corner back to the top left corner of the image.

(2) In the row scanning period F121, a gate turn-on signal (e.g., a high level in the signal ga-1) is applied to the scanning line GA corresponding to the first row of sub-pixels spx, and a gate turn-off signal (e.g., a low level in the signals ga-2 to ga-4) is applied to the scanning lines GA corresponding to the second to fourth rows of sub-pixels spx, so as to control the data writing transistors M1 in the first row of sub-pixels spx to be turned on and control the data writing transistors M1 in the second to fourth rows of sub-pixels spx to be turned off. Furthermore, a frequency modulation turn-off signal (such as a low level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx to be turned off. Accordingly, the storage electrodes 113 in the first row of sub-pixels spx are electrically disconnected from the data lines DA. In this case, the data signals may not be input to the data lines DA in order to reduce the power consumption.

In the row scanning period F122, a gate turn-on signal (e.g., a high level in the signal ga-2) is applied to the scanning line GA corresponding to the second row of sub-pixels spx, and a gate turn-off signal (e.g., a low level in the signals ga-1, ga-3, and ga-4) is applied to the scanning lines GA corresponding to the first, third, and fourth rows of sub-pixels spx, so as to control the data writing transistors M1 in the second row of sub-pixels spx to be turned on and control the data writing transistors M1 in the first, third, and fourth rows of sub-pixels spx to be turned off. Furthermore, a frequency modulation turn-off signal (e.g., a low level in the signals fm-1 and fm-4) is applied to the frequency modulation control lines FM corresponding to the first and fourth columns of sub-pixels spx; a frequency modulation turn-on signal (e.g., a high level in the signals fm-2 and fm-3) is applied to the frequency modulation control lines FM corresponding to the second and third columns of sub-pixels spx, so as to control the frequency modulation control transistors M2 in the first and fourth columns of sub-pixels spx in the second row to be turned off, and the frequency modulation control transistors M2 in the second and third columns of sub-pixels spx in the second row to be turned on. Therefore, the storage electrodes 113 in the second and third columns of the sub-pixel spx in the second row are electrically connected to the data lines DA, and the storage electrodes 113 in the first and fourth columns of the sub-pixel spx in the second row are electrically disconnected from the data lines DA. Data signals are respectively loaded to the data lines DA corresponding to the second and third columns of sub-pixels spx, so that the voltages of the data signals are input to the storage electrodes 113 in the second and third columns of sub-pixels spx in the second row, and thus the data refreshing of the second and third columns of sub-pixels spx in the second row is completed.

In the row scanning period F123, a gate turn-on signal (e.g., a high level in the signal ga-3) is applied to the scanning line GA corresponding to the third row of sub-pixels spx, and a gate turn-off signal (e.g., a low level in the signals ga-1, ga-2, and ga-4) is applied to the scanning lines GA corresponding to the first, second, and fourth rows of sub-pixels spx, so as to control the data writing transistors M1 in the third row of sub-pixels spx to be turned on and control the data writing transistors M1 in the first, second, and fourth rows of sub-pixels spx to be turned off. Furthermore, a frequency modulation turn-off signal (e.g., a low level in the signals fm-1 and fm-4) is applied to the frequency modulation control lines FM corresponding to the first and fourth columns of sub-pixels spx; a frequency modulation turn-on signal (e.g., a high level in the signals fm-2 and fm-3) is applied to the frequency modulation control lines FM corresponding to the second and third columns of sub-pixels spx, so as to control the frequency modulation control transistors M2 in the first and fourth columns of sub-pixels spx in the third row to be turned off, and the frequency modulation control transistors M2 in the second and third columns of sub-pixels spx in the third row to be turned on. Therefore, the storage electrodes 113 in the second and third columns of the sub-pixel spx in the third row are electrically connected to the data lines DA, and the storage electrodes 113 in the first and fourth columns of the sub-pixel spx in the third row are electrically disconnected from the data lines DA. Data signals are respectively loaded to the data lines DA corresponding to the second and third columns of sub-pixels spx, so that the voltages of the data signals are input to the storage electrodes 113 in the second and third columns of sub-pixels spx in the third row, and thus the data refreshing of the second and third columns of sub-pixels spx in the third row is completed.

In the row scanning period F124, a gate turn-on signal (e.g., a high level in the signal ga-4) is applied to the scanning line GA corresponding to the fourth row of sub-pixels spx, and a gate turn-off signal (e.g., a low level in the signals ga-1 to ga-3) is applied to the scanning lines GA corresponding to the first to third rows of sub-pixels spx, so as to control the data writing transistors M1 in the fourth row of sub-pixels spx to be turned on and control the data writing transistors M1 in the first to third rows of sub-pixels spx to be turned off. Furthermore, a frequency modulation turn-off signal (such as a low level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx to be turned off. Accordingly, the storage electrodes 113 in the fourth row of sub-pixels spx are electrically disconnected from the data lines DA. In this case, the data signals may not be input to the data lines DA in order to reduce the power consumption.

(3) Some preparatory operations may be performed in the blanking time period F21 in the second display frame, such as starting a scan of a new display frame from the bottom right corner back to the top left corner of the image.

(4) In the row scanning period F221, a gate turn-on signal (e.g., a high level in the signal ga-1) is applied to the scanning line GA corresponding to the first row of sub-pixels spx, and a gate turn-off signal (e.g., a low level in the signals ga-2 to ga-4) is applied to the scanning lines GA corresponding to the second to fourth rows of sub-pixels spx, so as to control the data writing transistors M1 in the first row of sub-pixels spx to be turned on and control the data writing transistors M1 in the second to fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the first row to be turned on. Accordingly, the storage electrodes 113 in the first row of sub-pixels spx are electrically connected to the data lines DA. Data signals are respectively loaded to the data lines DA corresponding to the sub-pixels spx, so that the voltages of the data signals are input to the storage electrodes 113 in the first row of sub-pixels spx, and thus the data refreshing of the first row of sub-pixels spx is completed.

In the row scanning period F222, a gate turn-on signal (e.g., a high level in the signal ga-2) is applied to the scanning line GA corresponding to the second row of sub-pixels spx, and a gate turn-off signal (e.g., a low level in the signals ga-1, ga-3 and ga-4) is applied to the scanning lines GA corresponding to the first, third, and fourth rows of sub-pixels spx, so as to control the data writing transistors M1 in the second row of sub-pixels spx to be turned on and control the data writing transistors M1 in the first, third, and fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the second row to be turned on. Accordingly, the storage electrodes 113 in the second row of sub-pixels spx are electrically connected to the data lines DA. Data signals are respectively loaded to the data lines DA corresponding to the sub-pixels spx, so that the voltages of the data signals are input to the storage electrodes 113 in the second row of sub-pixels spx, and thus the data refreshing of the second row of sub-pixels spx is completed.

In the row scanning period F223, a gate turn-on signal (e.g., a high level in the signal ga-3) is applied to the scanning line GA corresponding to the third row of sub-pixels spx, and a gate turn-off signal (e.g., a low level in the signals ga-1, ga-2 and ga-4) is applied to the scanning lines GA corresponding to the first, second, and fourth rows of sub-pixels spx, so as to control the data writing transistors M1 in the third row of sub-pixels spx to be turned on and control the data writing transistors M1 in the first, second, and fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the third row to be turned on. Accordingly, the storage electrodes 113 in the third row of sub-pixels spx are electrically connected to the data lines DA. Data signals are respectively loaded to the data lines DA corresponding to the sub-pixels spx, so that the voltages of the data signals are input to the storage electrodes 113 in the third row of sub-pixels spx, and thus the data refreshing of the third row of sub-pixels spx is completed.

In the row scanning period F224, a gate turn-on signal (e.g., a high level in the signal ga-4) is applied to the scanning line GA corresponding to the fourth row of sub-pixels spx, and a gate turn-off signal (e.g., a low level in the signals ga-1 to ga-3) is applied to the scanning lines GA corresponding to the first to third rows of sub-pixels spx, so as to control the data writing transistors M1 in the fourth row of sub-pixels spx to be turned on and control the data writing transistors M1 in the first to third rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the fourth row to be turned on. Accordingly, the storage electrodes 113 in the fourth row of sub-pixels spx are electrically connected to the data lines DA. Data signals are respectively loaded to the data lines DA corresponding to the sub-pixels spx, so that the voltages of the data signals are input to the storage electrodes 113 in the fourth row of sub-pixels spx, and thus the data refreshing of the fourth row of sub-pixels spx is completed.

(5) In the blanking time period F31 in the third display frame, the gaze region may be rectangular. For example, as shown in FIG. 4, a coordinate $(x_0'', y_0'')$ of a gaze point, watched by eyes of the user, in the display region AA of the display panel may be determined by using the visual tracking technology. Then, $x_0''\pm\Delta x$ is obtained by expanding the abscissa $x_0''$ in the coordinate of the gaze point, and $y_0''\pm\Delta y$ is obtained by expanding the ordinate $y_0''$ in the coordinate of the gaze point. A specific position of the gaze region in the display region AA is determined by using $(x_0''-\Delta x, y_0''-\Delta y)$, $(x_0''-\Delta x, y_0''+\Delta y)$, $(x_0''+\Delta x, y_0''+\Delta y)$, $(x_0''+\Delta x, y_0''-\Delta y)$ as coordinates of four vertex angles of the gaze region. For example, the determined gaze region is the gaze region ZSB2 shown in FIG. 6a. The remaining region is the non-gaze region NZSB. Some preparatory operations may be performed in the blanking time period F31, such as starting a scan of a new display frame from the bottom right corner back to the top left corner of the image.

(6) In the row scanning period F321, a gate turn-on signal (e.g., a high level in the signal ga-1) is applied to the scanning line GA corresponding to the first row of sub-pixels spx, and a gate turn-off signal (e.g., a low level in the signals ga-2 to ga-4) is applied to the scanning lines GA corresponding to the second to fourth rows of sub-pixels spx, so as to control the data writing transistors M1 in the first row of sub-pixels spx to be turned on and control the data writing transistors M1 in the second to fourth rows of sub-pixels spx to be turned off. Furthermore, a frequency modulation turn-off signal (such as a low level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx to be turned off. Accordingly, the storage electrodes 113 in the first row of sub-pixels spx are electrically disconnected from the data lines DA. In this case, the data signals may not be input to the data lines DA in order to reduce the power consumption.

In the row scanning period F322, a gate turn-on signal (e.g., a high level in the signal ga-2) is applied to the scanning line GA corresponding to the second row of sub-pixels spx, and a gate turn-off signal (e.g., a low level in the signals ga-1, ga-3 and ga-4) is applied to the scanning lines GA corresponding to the first, third, and fourth rows of sub-pixels spx, so as to control the data writing transistors M1 in the second row of sub-pixels spx to be turned on and control the data writing transistors M1 in the first, third, and fourth rows of sub-pixels spx to be turned off. Furthermore, a frequency modulation turn-off signal (such as a low level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx to be turned off. Accordingly, the storage electrodes 113 in the second row of sub-pixels spx are electrically disconnected from the data lines DA. In this case, the data signals may not be input to the data lines DA in order to reduce the power consumption.

In the row scanning period F323, a gate turn-on signal (e.g., a high level in the signal ga-3) is applied to the scanning line GA corresponding to the third row of sub-pixels spx, and a gate turn-off signal (e.g., a low level in the signals ga-1, ga-2, and ga-4) is applied to the scanning lines GA corresponding to the first, second, and fourth rows of sub-pixels spx, so as to control the data writing transistors M1 in the third row of sub-pixels spx to be turned on and control the data writing transistors M1 in the first, second, and fourth rows of sub-pixels spx to be turned off. Furthermore, a frequency modulation turn-off signal (e.g., a low level in the signals fm-1 and fm-2) is applied to the frequency modulation control lines FM corresponding to the first and second columns of sub-pixels spx; a frequency modulation turn-on signal (e.g., a high level in the signals fm-3 and fm-4) is applied to the frequency modulation control lines FM corresponding to the third and fourth columns of sub-pixels spx, so as to control the frequency modulation control transistors M2 in the first and second columns of sub-pixels spx in the third row to be turned off, and the frequency modulation control transistors M2 in the third and fourth columns of sub-pixels spx in the third row to be turned on. Therefore, the storage electrodes 113 in the third and fourth columns of the sub-pixel spx in the third row are electrically connected to the data lines DA, and the storage electrodes 113 in the first and second columns of the sub-pixel spx in the third row are electrically disconnected from the data lines DA. Data signals are respectively loaded to the data lines DA corresponding to the third and fourth columns of sub-pixels spx, so that the voltages of the data signals are input to the storage electrodes 113 in the third and fourth columns of sub-pixels spx in the third row, and thus the data refreshing of the third and fourth columns of sub-pixels spx in the third row is completed.

In the row scanning period F324, a gate turn-on signal (e.g., a high level in the signal ga-4) is applied to the scanning line GA corresponding to the fourth row of sub-pixels spx, and a gate turn-off signal (e.g., a low level in the signals ga-1 to ga-3) is applied to the scanning lines GA corresponding to the first to third rows of sub-pixels spx, so as to control the data writing transistors M1 in the fourth row of sub-pixels spx to be turned on and control the data writing transistors M1 in the first to third rows of sub-pixels spx to be turned off. Furthermore, a frequency modulation turn-off signal (e.g., a low level in the signals fm-1 and fm-2) is applied to the frequency modulation control lines FM corresponding to the first and second columns of sub-pixels spx; a frequency modulation turn-on signal (e.g., a high level in the signals fm-3 and fm-4) is applied to the frequency modulation control lines FM corresponding to the third and fourth columns of sub-pixels spx, so as to control the frequency modulation control transistors M2 in the first and second columns of sub-pixels spx in the fourth row to be turned off, and the frequency modulation control transistors M2 in the third and fourth columns of sub-pixels spx in the fourth row to be turned on. Therefore, the storage electrodes 113 in the third and fourth columns of the sub-pixel spx in the fourth row are electrically connected to the data lines DA, and the storage electrodes 113 in the first and second columns of the sub-pixel spx in the fourth row are electrically disconnected from the data lines DA. Data signals are respectively loaded to the data lines DA corresponding to the third and fourth columns of sub-pixels spx, so that the voltages of the data signals are input to the storage electrodes 113 in the third and fourth columns of sub-pixels spx in the fourth row, and thus the data refreshing of the third and fourth columns of sub-pixels spx in the fourth row is completed.

(7) Some preparatory operations may be performed in the blanking time period F41 in the fourth display frame, such as starting a scan of a new display frame from the bottom right corner back to the top left corner of the image.

(8) In the row scanning period F421, a gate turn-on signal (e.g., a high level in the signal ga-1) is applied to the scanning line GA corresponding to the first row of sub-pixels spx, and a gate turn-off signal (e.g., a low level in the signals ga-2 to ga-4) is applied to the scanning lines GA corresponding to the second to fourth rows of sub-pixels spx, so as to control the data writing transistors M1 in the first row of sub-pixels spx to be turned on and control the data writing transistors M1 in the second to fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the first row to be turned on. Accordingly, the storage electrodes 113 in the first row of sub-pixels spx are electrically connected to the data lines DA. Data signals are respectively loaded to the data lines DA corresponding to the sub-pixels spx, so that the voltages of the data signals are input to the storage electrodes 113 in the first row of sub-pixels spx, and thus the data refreshing of the first row of sub-pixels spx is completed.

In the row scanning period F422, a gate turn-on signal (e.g., a high level in the signal ga-2) is applied to the scanning line GA corresponding to the second row of sub-pixels spx, and a gate turn-off signal (e.g., a low level in the signals ga-1, ga-3 and ga-4) is applied to the scanning lines GA corresponding to the first, third, and fourth rows of sub-pixels spx, so as to control the data writing transistors M1 in the second row of sub-pixels spx to be turned on and control the data writing transistors M1 in the first, third, and fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the second row to be turned on. Accordingly, the storage electrodes 113 in the second row of sub-pixels spx are electrically connected to the data lines DA. Data signals are respectively loaded to the data lines DA corresponding to the sub-pixels spx, so that the voltages of the data signals are input to the storage electrodes 113 in the second row of sub-pixels spx, and thus the data refreshing of the second row of sub-pixels spx is completed.

In the row scanning period F423, a gate turn-on signal (e.g., a high level in the signal ga-3) is applied to the scanning line GA corresponding to the third row of sub-pixels spx, and a gate turn-off signal (e.g., a low level in the signals ga-1, ga-2 and ga-4) is applied to the scanning lines GA corresponding to the first, second, and fourth rows of sub-pixels spx, so as to control the data writing transistors M1 in the third row of sub-pixels spx to be turned on and control the data writing transistors M1 in the first, second, and fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the third row to be turned on. Accordingly, the storage electrodes 113 in the third row of sub-pixels spx are electrically connected to the data lines DA. Data signals are respectively loaded to the data lines DA corresponding to the sub-pixels spx, so that the voltages of the data signals are input to the storage electrodes 113 in the third row of sub-pixels spx, and thus the data refreshing of the third row of sub-pixels spx is completed.

In the row scanning period F424, a gate turn-on signal (e.g., a high level in the signal ga-4) is applied to the scanning line GA corresponding to the fourth row of sub-pixels spx, and a gate turn-off signal (e.g., a low level in the signals ga-1 to ga-3) is applied to the scanning lines GA corresponding to the first to third rows of sub-pixels spx, so as to control the data writing transistors M1 in the fourth row of sub-pixels spx to be turned on and control the data writing transistors M1 in the first to third rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the fourth row to be turned on. Accordingly, the storage electrodes 113 in the fourth row of sub-pixels spx are electrically connected to the data lines DA. Data signals are respectively loaded to the data lines DA corresponding to the sub-pixels spx, so that the voltages of the data signals are input to the storage electrodes 113 in the fourth row of sub-pixels spx, and thus the data refreshing of the fourth row of sub-pixels spx is completed.

The embodiment of the present disclosure provides another method for driving a display panel, which modifies the implementation in the above embodiments. Only a difference between the present embodiment and the above embodiments will be described below, and the same parts will not be described herein again.

In some examples, in a specific implementation, M=2, each refresh cycle includes two display frames. In particular implementations, the gaze region, watched by eyes of the user, in the display region of the display panel may be determined within an even display frame of the refresh cycle. For example, when a first display frame and a second display frame are used as a first refresh cycle, the gaze region, watched by eyes of the user, in the display region of the display panel may be determined within the second display frame. When a third display frame and a fourth display frame are used as a second refresh cycle, the gaze region, watched by eyes of the user, in the display region of the display panel may be determined within the fourth display frame. When a fifth display frame and a sixth display frame are used as a third refresh cycle, the gaze region, watched by eyes of the user, in the display region of the display panel may be determined within the sixth display frame. When a seventh display frame and an eighth display frame are used as a fourth refresh cycle, the gaze region, watched by eyes of the user, in the display region of the display panel may be determined within the eighth display frame. When a ninth display frame and a tenth display frame are used as a fifth refresh cycle, the gaze region, watched by eyes of the user, in the display region of the display panel may be determined within the tenth display frame.

In some examples, only refreshing data for the gaze region in the K display frames; and refreshing data of the sub-pixels in the gaze region and the non-gaze region in display frames except the K display frames in the refresh cycle, may specifically include: refreshing data of the sub-pixels in the gaze region and the non-gaze region within each odd number of the display frames of the refresh cycle; and only refreshing data for the gaze region in each even number of the display frames of the refresh cycle.

In some examples, in a specific implementation, refreshing data of the sub-pixels in the gaze region and the non-gaze region in each odd number of the display frames of the refresh cycle may specifically include: loading gate turn-on signals to the plurality of scanning lines row by row in each odd number of display frames, so as to control the data writing circuits in the sub-pixels row by row to electrically connect the corresponding data lines and the frequency modulation control circuits coupled to the data writing circuits; loading frequency modulation turn-on signals to each frequency modulation control line, so as to control frequency modulation control circuits in the sub-pixels to electrically connect the data writing circuits and the storage electrodes coupled to the frequency modulation control circuits; and loading data signals to the data lines corresponding to the sub-pixels.

In some examples, in a specific implementation, only refreshing data for the gaze region in each even number of the display frames of the refresh cycle may specifically include: loading gate turn-on signals to the plurality of scanning lines row by row in each even number of the display frames, so as to control the data writing circuits in the sub-pixels row by row to electrically connect the corresponding data lines and the frequency modulation control circuits coupled to the data writing circuits; loading frequency modulation turn-on signals on frequency modulation control lines corresponding to the sub-pixels in the gaze region and loading frequency modulation turn-off signals on frequency modulation control lines except the frequency modulation control lines corresponding to the sub-pixels in the gaze region when gate turn-on signals are loaded on scanning lines corresponding to sub-pixels in the gaze region, to control frequency modulation control circuits in the sub-pixels in the gaze region to electrically connect the data writing circuits and the storage electrodes coupled to the frequency modulation control circuits; and loading data signals to the data lines corresponding to the sub-pixels in the gaze region.

The operation process of the driving method according to the embodiment of the present disclosure will be described below with reference to the display panel shown in FIGS. 6a and 6b and the signal timing diagram shown in FIGS. 8a to 8d, by taking M=2 and the first to fourth display frames as an example.

F1 represents the first display frame, F11 represents the blanking time period in the first display frame, and F12 represents the data refresh period in the first display frame. F121 to F124 represent row scanning periods in the data refresh period in the first display frame.

F2 represents the second display frame, F21 represents the blanking time period in the second display frame, and F22 represents the data refresh period in the second display frame. F221 to F224 represent the row scanning periods in the data refresh period in the second display frame.

F3 represents the third display frame, F31 represents the blanking time period in the third display frame, and F32 represents the data refresh period in the third display frame. F321 to F324 represent the row scanning periods in the data refresh period in the third display frame.

F4 represents the fourth display frame, F41 represents the blanking time period in the fourth display frame, and F42 represents the data refresh period in the fourth display frame. F421 to F424 represent the row scanning periods in the data refresh period in the fourth display frame.

ga-1 represents a signal transmitted on a scanning line GA corresponding to a first row of sub-pixels spx, ga-2 represents a signal transmitted on a scanning line GA corresponding to a second row of sub-pixels spx, ga-3 represents a signal transmitted on a scanning line GA corresponding to a third row of sub-pixels spx, and ga-4 represents a signal transmitted on a scanning line GA corresponding to a fourth row of sub-pixels spx.

fm-1 represents a signal transmitted on a frequency modulation control line FM corresponding to a first column of sub-pixels spx, fm-2 represents a signal transmitted on a frequency modulation control line FM corresponding to a second column of sub-pixels spx, fm-3 represents a signal transmitted on a frequency modulation control line FM corresponding to a third column of sub-pixels spx, and fm-4 represents a signal transmitted on a frequency modulation control line FM corresponding to a fourth column of sub-pixels spx.

The driving method according to the embodiment of the present disclosure may include the following steps:

(1) Some preparatory operations may be performed in the blanking time period F11 in the first display frame, such as starting a scan of a new display frame from the bottom right corner back to the top left corner of the image.

(2) In the row scanning period F121, a gate turn-on signal (e.g., a high level in the signal ga-1) is applied to the scanning line GA corresponding to the first row of sub-pixels spx, and a gate turn-off signal (e.g., a low level in the signals ga-2 to ga-4) is applied to the scanning lines GA corresponding to the second to fourth rows of sub-pixels spx, so as to control the data writing transistors M1 in the first row of sub-pixels spx to be turned on and control the data writing transistors M1 in the second to fourth rows of sub-pixels spx to be turned off. Furthermore, a frequency modulation turn-on signal (e.g., a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the first row to be turned on. Therefore, the storage electrodes 113 in the first row of the sub-pixel spx are electrically connected to the data lines DA. Data signals are respectively loaded to the data lines DA corresponding to the sub-pixels spx, so that the voltages of the data signals are input to the storage electrodes 113 in the first row of sub-pixels spx, and thus the data refreshing of the first row of sub-pixels spx is completed.

In the row scanning period F122, a gate turn-on signal (e.g., a high level in the signal ga-2) is applied to the scanning line GA corresponding to the second row of sub-pixels spx, and a gate turn-off signal (e.g., a low level in the signals ga-1, ga-3, and ga-4) is applied to the scanning lines GA corresponding to the first, third, and fourth rows of sub-pixels spx, so as to control the data writing transistors M1 in the second row of sub-pixels spx to be turned on and control the data writing transistors M1 in the first, third, and fourth rows of sub-pixels spx to be turned off. Furthermore, a frequency modulation turn-on signal (e.g., a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the second row to be turned on. Therefore, the storage electrodes 113 in the second row of the sub-pixel spx are electrically connected to the data lines DA. Data signals are respectively loaded to the data lines DA corresponding to the sub-pixels spx, so that the voltages of the data signals are input to the storage electrodes 113 in the second row of sub-pixels spx, and thus the data refreshing of the second row of sub-pixels spx is completed.

In the row scanning period F123, a gate turn-on signal (e.g., a high level in the signal ga-3) is applied to the scanning line GA corresponding to the third row of sub-pixels spx, and a gate turn-off signal (e.g., a low level in the signals ga-1, ga-2, and ga-4) is applied to the scanning lines GA corresponding to the first, second, and fourth rows of sub-pixels spx, so as to control the data writing transistors M1 in the third row of sub-pixels spx to be turned on and control the data writing transistors M1 in the first, second, and fourth rows of sub-pixels spx to be turned off. Furthermore, a frequency modulation turn-on signal (e.g., a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the third row to be turned on. Therefore, the storage electrodes 113 in the third row of the sub-pixel spx are electrically connected to the data lines DA. Data signals are respectively loaded to the data lines DA corresponding to the sub-pixels spx, so that the voltages of the data signals are input to the storage electrodes 113 in the third row of sub-pixels spx, and thus the data refreshing of the third row of sub-pixels spx is completed.

In the row scanning period F124, a gate turn-on signal (e.g., a high level in the signal ga-4) is applied to the scanning line GA corresponding to the fourth row of sub-pixels spx, and a gate turn-off signal (e.g., a low level in the signals ga-1 to ga-3) is applied to the scanning lines GA corresponding to the first to third rows of sub-pixels spx, so as to control the data writing transistors M1 in the fourth row of sub-pixels spx to be turned on and control the data writing transistors M1 in the first to third rows of sub-pixels spx to be turned off. Furthermore, a frequency modulation turn-on signal (e.g., a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the fourth row to be turned on. Therefore, the storage electrodes 113 in the fourth row of the sub-pixel spx are electrically connected to the data lines DA. Data signals are respectively loaded to the data lines DA corresponding to the sub-pixels spx, so that the voltages of the data signals are input to the storage electrodes 113 in the fourth row of sub-pixels spx, and thus the data refreshing of the fourth row of sub-pixels spx is completed.

(3) In the blanking time period F21 in the second display frame, the gaze region may be rectangular. For example, as shown in FIG. 4, a coordinate $(x_0', y_0')$ of a gaze point, watched by eyes of the user, in the display region AA of the display panel may be determined by using the visual tracking technology. Then, $x_0' \pm \Delta x$ is obtained by expanding the abscissa $x_0'$ in the coordinate of the gaze point, and $y_0' \pm \Delta y$ is obtained by expanding the ordinate $y_0'$ in the coordinate of the gaze point. A specific position of the gaze region in the display region AA is determined by using $(x_0'-\Delta x, y_0'-\Delta y)$, $(x_0'-\Delta x, y_0'+\Delta y)$, $(x_0'+\Delta x, y_0'+\Delta y)$, $(x_0'+\Delta x, y_0'-\Delta y)$ as coordinates of four vertex angles of the gaze region. For example, the determined gaze region is the gaze region ZSB1 shown in FIG. 6a. The remaining region is the non-gaze region NZSB.

Some preparatory operations may be performed in the blanking time period F21, such as starting a scan of a new display frame from the bottom right corner back to the top left corner of the image.

(4) In the row scanning period F221, a gate turn-on signal (e.g., a high level in the signal ga-1) is applied to the scanning line GA corresponding to the first row of sub-pixels spx, and a gate turn-off signal (e.g., a low level in the signals ga-2 to ga-4) is applied to the scanning lines GA corresponding to the second to fourth rows of sub-pixels spx, so as to control the data writing transistors M1 in the first row of sub-pixels spx to be turned on and control the data writing transistors M1 in the second to fourth rows of sub-pixels spx to be turned off. Furthermore, a frequency modulation turn-off signal (such as a low level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx to be turned off. Accordingly, the storage electrodes 113 in the first row of sub-pixels spx are electrically disconnected from the data lines DA. In this case, the data signals may not be input to the data lines DA in order to reduce the power consumption.

In the row scanning period F222, a gate turn-on signal (e.g., a high level in the signal ga-2) is applied to the scanning line GA corresponding to the second row of sub-pixels spx, and a gate turn-off signal (e.g., a low level in the signals ga-1, ga-3 and ga-4) is applied to the scanning lines GA corresponding to the first, third, and fourth rows of sub-pixels spx, so as to control the data writing transistors M1 in the second row of sub-pixels spx to be turned on and control the data writing transistors M1 in the first, third, and fourth rows of sub-pixels spx to be turned off. Furthermore, a frequency modulation turn-off signal (e.g., a low level in the signals fm-1 and fm-4) is applied to the frequency modulation control lines FM corresponding to the first and fourth columns of sub-pixels spx; a frequency modulation turn-on signal (e.g., a high level in the signals fm-2 and fm-3) is applied to the frequency modulation control lines FM corresponding to the second and third columns of sub-pixels spx, so as to control the frequency modulation control transistors M2 in the first and fourth columns of sub-pixels spx in the second row to be turned off, and the frequency modulation control transistors M2 in the second and third columns of sub-pixels spx in the second row to be turned on. Therefore, the storage electrodes 113 in the second and third columns of the sub-pixel spx in the second row are electrically connected to the data lines DA, and the storage electrodes 113 in the first and fourth columns of the sub-pixel spx in the second row are electrically disconnected from the data lines DA. Data signals are respectively loaded to the data lines DA corresponding to the second and third columns of sub-pixels spx, so that the voltages of the data signals are input to the storage electrodes 113 in the second and third columns of sub-pixels spx in the second row, and thus the data refreshing of the second and third columns of sub-pixels spx in the second row is completed.

In the row scanning period F223, a gate turn-on signal (e.g., a high level in the signal ga-3) is applied to the scanning line GA corresponding to the third row of sub-pixels spx, and a gate turn-off signal (e.g., a low level in the signals ga-1, ga-2 and ga-4) is applied to the scanning lines GA corresponding to the first, second, and fourth rows of sub-pixels spx, so as to control the data writing transistors M1 in the third row of sub-pixels spx to be turned on and control the data writing transistors M1 in the first, second, and fourth rows of sub-pixels spx to be turned off. Furthermore, a frequency modulation turn-off signal (e.g., a low level in the signals fm-1 and fm-4) is applied to the frequency modulation control lines FM corresponding to the first and fourth columns of sub-pixels spx; a frequency modulation turn-on signal (e.g., a high level in the signals fm-2 and fm-3) is applied to the frequency modulation control lines FM corresponding to the second and third columns of sub-pixels spx, so as to control the frequency modulation control transistors M2 in the first and fourth columns of sub-pixels spx in the third row to be turned off, and the frequency modulation control transistors M2 in the second and third columns of sub-pixels spx in the third row to be turned on. Therefore, the storage electrodes 113 in the second and third columns of the sub-pixel spx in the third row are electrically connected to the data lines DA, and the storage electrodes 113 in the first and fourth columns of the sub-pixel spx in the third row are electrically disconnected from the data lines DA. Data signals are respectively loaded to the data lines DA corresponding to the second and third columns of sub-pixels spx, so that the voltages of the data signals are input to the storage electrodes 113 in the second and third columns of sub-pixels spx in the third row, and thus the data refreshing of the second and third columns of sub-pixels spx in the third row is completed.

In the row scanning period F224, a gate turn-on signal (e.g., a high level in the signal ga-4) is applied to the scanning line GA corresponding to the fourth row of sub-pixels spx, and a gate turn-off signal (e.g., a low level in the signals ga-1 to ga-3) is applied to the scanning lines GA corresponding to the first to third rows of sub-pixels spx, so as to control the data writing transistors M1 in the fourth row of sub-pixels spx to be turned on and control the data writing transistors M1 in the first to third rows of sub-pixels spx to be turned off. Furthermore, a frequency modulation turn-off signal (such as a low level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx to be turned off. Accordingly, the storage electrodes 113 in the fourth row of sub-pixels spx are electrically disconnected from the data lines DA. In this case, the data signals may not be input to the data lines DA in order to reduce the power consumption.

(5) Some preparatory operations may be performed in the blanking time period F31 in the third display frame, such as starting a scan of a new display frame from the bottom right corner back to the top left corner of the image.

(6) In the row scanning period F321, a gate turn-on signal (e.g., a high level in the signal ga-1) is applied to the scanning line GA corresponding to the first row of sub-pixels spx, and a gate turn-off signal (e.g., a low level in the signals ga-2 to ga-4) is applied to the scanning lines GA corresponding to the second to fourth rows of sub-pixels spx, so as to control the data writing transistors M1 in the first row of sub-pixels spx to be turned on and control the data writing transistors M1 in the second to fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the first row to be turned on. Accordingly, the storage electrodes 113 in the first row of sub-pixels spx are electrically connected to the data lines DA. Data signals are respectively loaded to the data lines DA corresponding to the sub-pixels spx, so that the voltages of the data signals are input to the storage electrodes 113 in the first row of sub-pixels spx, and thus the data refreshing of the first row of sub-pixels spx is completed.

In the row scanning period F322, a gate turn-on signal (e.g., a high level in the signal ga-2) is applied to the scanning line GA corresponding to the second row of sub-pixels spx, and a gate turn-off signal (e.g., a low level in the signals ga-1, ga-3 and ga-4) is applied to the scanning lines GA corresponding to the first, third, and fourth rows of sub-pixels spx, so as to control the data writing transistors M1 in the second row of sub-pixels spx to be turned on and control the data writing transistors M1 in the first, third, and fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the second row to be turned on. Accordingly, the storage electrodes 113 in the second row of sub-pixels spx are electrically connected to the data lines DA. Data signals are respectively loaded to the data lines DA corresponding to the sub-pixels spx, so that the voltages of the data signals are input to the storage electrodes 113 in the second row of sub-pixels spx, and thus the data refreshing of the second row of sub-pixels spx is completed.

In the row scanning period F323, a gate turn-on signal (e.g., a high level in the signal ga-3) is applied to the scanning line GA corresponding to the third row of sub-pixels spx, and a gate turn-off signal (e.g., a low level in the signals ga-1, ga-2 and ga-4) is applied to the scanning lines GA corresponding to the first, second, and fourth rows of sub-pixels spx, so as to control the data writing transistors M1 in the third row of sub-pixels spx to be turned on and control the data writing transistors M1 in the first, second, and fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the third row to be turned on. Accordingly, the storage electrodes 113 in the third row of sub-pixels spx are electrically connected to the data lines DA. Data signals are respectively loaded to the data lines DA corresponding to the sub-pixels spx, so that the voltages of the data signals are input to the storage electrodes 113 in the third row of sub-pixels spx, and thus the data refreshing of the third row of sub-pixels spx is completed.

In the row scanning period F324, a gate turn-on signal (e.g., a high level in the signal ga-4) is applied to the scanning line GA corresponding to the fourth row of sub-pixels spx, and a gate turn-off signal (e.g., a low level in the signals ga-1 to ga-3) is applied to the scanning lines GA corresponding to the first to third rows of sub-pixels spx, so as to control the data writing transistors M1 in the fourth row of sub-pixels spx to be turned on and control the data writing transistors M1 in the first to third rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the fourth row to be turned on. Accordingly, the storage electrodes 113 in the fourth row of sub-pixels spx are electrically connected to the data lines DA. Data signals are respectively loaded to the data lines DA corresponding to the sub-pixels spx, so that the voltages of the data signals are input to the storage electrodes 113 in the fourth row of sub-pixels spx, and thus the data refreshing of the fourth row of sub-pixels spx is completed.

(7) In the blanking time period F41 in the fourth display frame, the gaze region may be rectangular. For example, as shown in FIG. 4, a coordinate $(x_0'', y_0'')$ of a gaze point, watched by eyes of the user, in the display region AA of the display panel may be determined by using the visual tracking technology. Then, $x_0'' \pm \Delta x$ is obtained by expanding the abscissa $x_0''$ in the coordinate of the gaze point, and $y_0'' \pm \Delta y$ is obtained by expanding the ordinate $y_0''$ in the coordinate of the gaze point. A specific position of the gaze region in the display region AA is determined by using $(x_0''-\Delta x, y_0''-\Delta y)$, $(x_0''-\Delta x, y_0''+\Delta y)$, $(x_0''+\Delta x, y_0''+\Delta y)$, $(x_0''+\Delta x, y_0''-\Delta y)$ as coordinates of four vertex angles of the gaze region. For example, the determined gaze region is the gaze region ZSB2 shown in FIG. 6a. The remaining region is the non-gaze region NZSB. Some preparatory operations may be performed in the blanking time period F41, such as starting a scan of a new display frame from the bottom right corner back to the top left corner of the image.

(8) In the row scanning period F421, a gate turn-on signal (e.g., a high level in the signal ga-1) is applied to the scanning line GA corresponding to the first row of sub-pixels spx, and a gate turn-off signal (e.g., a low level in the signals ga-2 to ga-4) is applied to the scanning lines GA corresponding to the second to fourth rows of sub-pixels spx, so as to control the data writing transistors M1 in the first row of sub-pixels spx to be turned on and control the data writing transistors M1 in the second to fourth rows of sub-pixels spx to be turned off. Furthermore, a frequency modulation turn-off signal (such as a low level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx to be turned off. Accordingly, the storage electrodes 113 in the first row of sub-pixels spx are electrically disconnected from the data lines DA. In this case, the data signals may not be input to the data lines DA in order to reduce the power consumption.

In the row scanning period F422, a gate turn-on signal (e.g., a high level in the signal ga-2) is applied to the scanning line GA corresponding to the second row of sub-pixels spx, and a gate turn-off signal (e.g., a low level in the signals ga-1, ga-3 and ga-4) is applied to the scanning lines GA corresponding to the first, third, and fourth rows of sub-pixels spx, so as to control the data writing transistors M1 in the second row of sub-pixels spx to be turned on and control the data writing transistors M1 in the first, third, and fourth rows of sub-pixels spx to be turned off. Furthermore, a frequency modulation turn-off signal (such as a low level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx to be turned off. Accordingly, the storage electrodes 113 in the second row of sub-pixels spx are electrically disconnected from the data lines DA. In this case, the data signals may not be input to the data lines DA in order to reduce the power consumption.

In the row scanning period F423, a gate turn-on signal (e.g., a high level in the signal ga-3) is applied to the scanning line GA corresponding to the third row of sub-pixels spx, and a gate turn-off signal (e.g., a low level in the signals ga-1, ga-2 and ga-4) is applied to the scanning lines GA corresponding to the first, second, and fourth rows of sub-pixels spx, so as to control the data writing transistors M1 in the third row of sub-pixels spx to be turned on and control the data writing transistors M1 in the first, second, and fourth rows of sub-pixels spx to be turned off. Furthermore, a frequency modulation turn-off signal (e.g., a low level in the signals fm-1 and fm-2) is applied to the frequency modulation control lines FM corresponding to the first and second columns of sub-pixels spx; a frequency modulation turn-on signal (e.g., a high level in the signals fm-3 and fm-4) is applied to the frequency modulation control lines FM corresponding to the third and fourth columns of sub-pixels spx, so as to control the frequency modulation control transistors M2 in the first and second columns of sub-pixels spx in the third row to be turned off, and the frequency modulation control transistors M2 in the third and fourth columns of sub-pixels spx in the third row to be turned on. Therefore, the storage electrodes 113 in the third and fourth columns of the sub-pixel spx in the third row are electrically connected to the data lines DA, and the storage electrodes 113 in the first and second columns of the sub-pixel spx in the third row are electrically disconnected from the data lines DA. Data signals are respectively loaded to the data lines DA corresponding to the third and fourth columns of sub-pixels spx, so that the voltages of the data signals are input to the storage electrodes 113 in the third and fourth columns of sub-pixels spx in the third row, and thus the data refreshing of the third and fourth columns of sub-pixels spx in the third row is completed.

In the row scanning period F424, a gate turn-on signal (e.g., a high level in the signal ga-4) is applied to the scanning line GA corresponding to the fourth row of sub-pixels spx, and a gate turn-off signal (e.g., a low level in the signals ga-1 to ga-3) is applied to the scanning lines GA corresponding to the first to third rows of sub-pixels spx, so as to control the data writing transistors M1 in the fourth row of sub-pixels spx to be turned on and control the data writing transistors M1 in the first to third rows of sub-pixels spx to be turned off. Furthermore, a frequency modulation turn-off signal (e.g., a low level in the signals fm-1 and fm-2) is applied to the frequency modulation control lines FM corresponding to the first and second columns of sub-pixels spx; a frequency modulation turn-on signal (e.g., a high level in the signals fm-3 and fm-4) is applied to the frequency modulation control lines FM corresponding to the third and fourth columns of sub-pixels spx, so as to control the frequency modulation control transistors M2 in the first and second columns of sub-pixels spx in the fourth row to be turned off, and the frequency modulation control transistors M2 in the third and fourth columns of sub-pixels spx in the fourth row to be turned on. Therefore, the storage electrodes 113 in the third and fourth columns of the sub-pixel spx in the fourth row are electrically connected to the data lines DA, and the storage electrodes 113 in the first and second columns of the sub-pixel spx in the fourth row are electrically disconnected from the data lines DA. Data signals are respectively loaded to the data lines DA corresponding to the third and fourth columns of sub-pixels spx, so that the voltages of the data signals are input to the storage electrodes 113 in the third and fourth columns of sub-pixels spx in the fourth row, and thus the data refreshing of the third and fourth columns of sub-pixels spx in the fourth row is completed.

In some examples, determining a gaze region, watched by eyes of a user, in a display region of the display panel may specifically include: determining the gaze region, watched by eyes of the user, in the display region of the display panel within at least one display frame.

In some examples, refreshing data of at least some of the sub-pixels in the display panel according to a set rule and in combination with the gaze region specifically includes:

compressing initial image data corresponding to the non-gaze region except the gaze region in the display region, to determine the compressed image data corresponding to the non-gaze region; wherein a data amount of the compressed image data corresponding to the non-gaze region is less than that of the initial image data corresponding to the non-gaze region;

sending the initial image data corresponding to the gaze region and the compressed image data corresponding to the non-gaze region to the display panel, and then decompressing the compressed image data corresponding to the non-gaze region;

refreshing data of the sub-pixels in the display panel according to the initial image data corresponding to the gaze region and the decompressed target image data corresponding to the non-gaze region.

Figure 9:
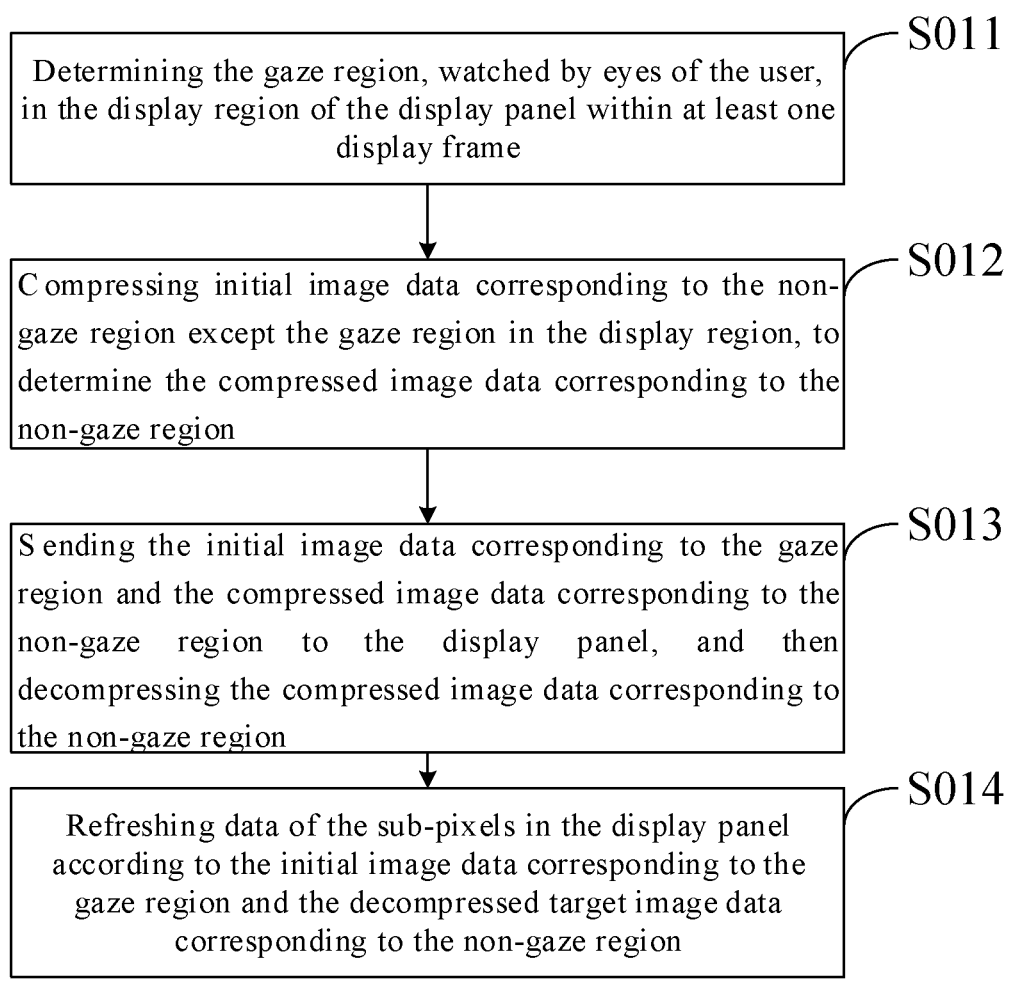
FIG. 9 is another flow chart of a driving method according to an embodiment of the present disclosure.

In some examples, the driving method for the display panel according to the embodiment of the present disclosure, as shown in FIG. 9, may include the following steps:

S011, determining the gaze region, watched by eyes of the user, in the display region of the display panel within at least one display frame.

In a practical application, the display panel, for example, when displaying video images, may employ a plurality of display frames to display the video images. The gaze region, watched by eyes of the user, in the display region of the display panel may be determined within each of a plurality of display frames for displaying the video images. Alternatively, the gaze region, watched by eyes of the user, in the display region of the display panel may be determined within some of the plurality of display frames for displaying the video images, for example, the gaze region, watched by eyes of the user, in the display region of the display panel may be determined every other one, two, three or more display frames. Alternatively, the display frame in which the gaze region is determined may be determined according to requirements of the practical application, and is not limited herein.

It should be noted that for the method for determining the gaze region, reference may be made to the above process, which is not described herein again.

S012, compressing initial image data corresponding to the non-gaze region except the gaze region in the display region, to determine the compressed image data corresponding to the non-gaze region; wherein a data amount of the compressed image data corresponding to the non-gaze region is less than that of the initial image data corresponding to the non-gaze region;

S013, sending the initial image data corresponding to the gaze region and the compressed image data corresponding to the non-gaze region to the display panel, and then decompressing the compressed image data corresponding to the non-gaze region;

S014, refreshing data of the sub-pixels in the display panel according to the initial image data corresponding to the gaze region and the decompressed target image data corresponding to the non-gaze region.

According to the driving method according to the embodiment of the present disclosure, the data amount is reduced by compressing the initial image data corresponding to the non-gaze region. Thus, when the initial image data corresponding to the gaze region and the compressed image data corresponding to the non-gaze region are transmitted to the display panel, the transmission amount of the image data can be reduced, and the bandwidth can be reduced.

In some examples, step S012, compressing initial image data corresponding to the non-gaze region except the gaze region in the display region, to determine the compressed image data corresponding to the non-gaze region, may specifically include:

dividing the non-gaze region into a first non-gaze region and a second non-gaze region, dividing pixel units in the first non-gaze region into a plurality of first unit groups, and dividing pixel units in the second non-gaze region into a plurality of second unit groups;

compressing initial image data corresponding to each pixel unit in each first unit group and each second unit group, to determine the compressed image data in one-to-one correspondence with the plurality of first unit groups, and to determine the compressed image data in one-to-one correspondence with the plurality of second unit groups.

Figure 10:
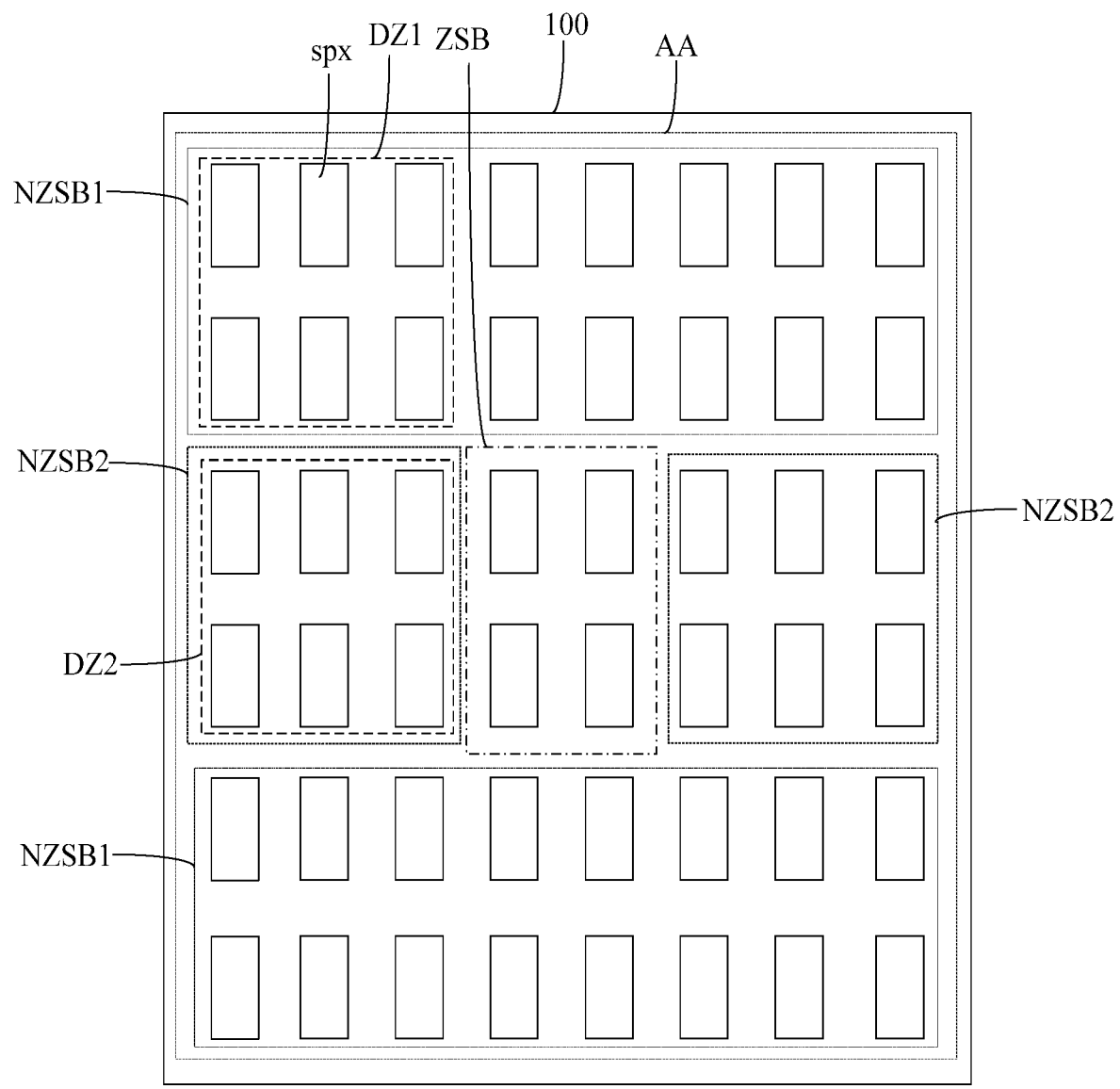
FIG. 10 is a schematic diagram of a part of another structure of a display panel according to an embodiment of the present disclosure.

For example, the sub-pixels in the display region which are located in different rows from the sub-pixels in the gaze region are determined as the sub-pixels in the first non-gaze region. That is, the sub-pixels in the first non-gaze region and the sub-pixels in the gaze region are located in different rows. The sub-pixels in the display region which are located in a same row as the sub-pixels in the gaze region are determined as the sub-pixels in the second non-gaze region. That is, the sub-pixels in the second non-gaze region and the sub-pixels in the gaze region are located in a same row. As shown in FIG. 10, the gaze region ZSB, the first non-gaze region NZSB1, and the second non-gaze region NZSB2 are determined.

For example, as shown in FIG. 10, each first unit group may include a plurality of pixel units adjacent to each other, and the pixel units in different first unit groups are different from each other. For example, each pixel unit may include 3 sub-pixels, and as shown in FIG. 10, every two adjacent pixel units in the same column may be set as one first unit group. Alternatively, the pixel units in every two adjacent rows and every two adjacent columns may be set as one first unit group. Alternatively, the pixel units in every three adjacent rows and every three adjacent columns may be set as one first unit group. Alternatively, in a practical application, each first unit group may be determined according to requirements of the practical application, and is not limited herein.

For example, as shown in FIG. 10, each second unit group may include a plurality of pixel units adjacent to each other, and the pixel units in different second unit groups are different from each other. For example, each pixel unit may include 3 sub-pixels, and as shown in FIG. 10, every two adjacent pixel units in the same column may be set as one second unit group. Alternatively, the pixel units in every two adjacent rows and every two adjacent columns may be set as one second unit group. Alternatively, the pixel units in every three adjacent rows and every three adjacent columns may be set as one second unit group. Alternatively, in a practical application, each second unit group may be determined according to requirements of the practical application, and is not limited herein.

For example, the compressed image data in one-to-one correspondence with the plurality of first unit groups includes compressed image data in one-to-one correspondence with sub-pixels of colors. For example, each pixel unit includes a red sub-pixel, a green sub-pixel, and a blue sub-pixel. The compressed image data in one-to-one correspondence with the plurality of first unit groups may include compressed image data corresponding to one red sub-pixel, compressed image data corresponding to one green sub-pixel, and compressed image data corresponding to one blue sub-pixel.

For example, the compressed image data in one-to-one correspondence with the plurality of second unit groups includes compressed image data in one-to-one correspondence with sub-pixels of colors. For example, each pixel unit includes a red sub-pixel, a green sub-pixel, and a blue sub-pixel. The compressed image data in one-to-one correspondence with the plurality of second unit groups may include compressed image data corresponding to one red sub-pixel, compressed image data corresponding to one green sub-pixel, and compressed image data corresponding to one blue sub-pixel.

In some examples, determining the compressed image data in one-to-one correspondence with the plurality of first unit groups may specifically include: determining initial image data corresponding to one pixel unit in each first unit group as the compressed image data in one-to-one correspondence with the plurality of first unit groups.

For example, each pixel unit includes a red sub-pixel, a green sub-pixel, and a blue sub-pixel, as an example. The red sub-pixel in each pixel unit corresponds to one piece of initial image data; the green sub-pixel in each pixel unit corresponds to one piece of initial image data; and the blue sub-pixel in each pixel unit corresponds to one piece of initial image data. The initial image data corresponding to the red, green, and blue sub-pixels in one pixel unit of a first unit group may be used as the compressed image data corresponding to the first unit group. Therefore, the initial image data corresponding to the plurality of pixel units in the first unit group may be compressed into the compressed image data corresponding to one pixel unit, so that the transmission of data amount can be reduced, and the bandwidth can be reduced.

In some examples, determining the compressed image data in one-to-one correspondence with the plurality of first unit groups may specifically include: determining an average value of initial image data corresponding to the sub-pixels with the same color in each pixel unit in each first unit group as the compressed image data in one-to-one correspondence with the plurality of first unit groups.

For example, each pixel unit includes a red sub-pixel, a green sub-pixel, and a blue sub-pixel, as an example. The red sub-pixel in each pixel unit corresponds to one piece of initial image data; the green sub-pixel in each pixel unit corresponds to one piece of initial image data; and the blue sub-pixel in each pixel unit corresponds to one piece of initial image data. An average value of the initial image data corresponding to the red sub-pixels in all the pixel units, an average value of the initial image data corresponding to the green sub-pixels in all the pixel units, and an average value of the initial image data corresponding to the blue sub-pixels in all the pixel units in a first unit group may be used as the compressed image data corresponding to the first unit group. Therefore, the initial image data corresponding to the plurality of pixel units in the first unit group may be compressed into the compressed image data corresponding to one pixel unit, so that the transmission of data amount can be reduced, and the bandwidth can be reduced.

In some examples, determining the compressed image data in one-to-one correspondence with the plurality of second unit groups may specifically include: determining initial image data corresponding to one pixel unit in each second unit group as the compressed image data in one-to-one correspondence with the plurality of second unit groups.

For example, each pixel unit includes a red sub-pixel, a green sub-pixel, and a blue sub-pixel, as an example. The red sub-pixel in each pixel unit corresponds to one piece of initial image data; the green sub-pixel in each pixel unit corresponds to one piece of initial image data; and the blue sub-pixel in each pixel unit corresponds to one piece of initial image data. The initial image data corresponding to the red, green, and blue sub-pixels in one pixel unit of a second unit group may be used as the compressed image data corresponding to the second unit group. Therefore, the initial image data corresponding to the plurality of pixel units in the second unit group may be compressed into the compressed image data corresponding to one pixel unit, so that the transmission of data amount can be reduced, and the bandwidth can be reduced.

In some examples, determining the compressed image data in one-to-one correspondence with the plurality of second unit groups may specifically include: determining an average value of initial image data corresponding to the sub-pixels with the same color in each pixel unit in each second unit group as the compressed image data in one-to-one correspondence with the plurality of second unit groups.

For example, each pixel unit includes a red sub-pixel, a green sub-pixel, and a blue sub-pixel, as an example. The red sub-pixel in each pixel unit corresponds to one piece of initial image data; the green sub-pixel in each pixel unit corresponds to one piece of initial image data; and the blue sub-pixel in each pixel unit corresponds to one piece of initial image data. An average value of the initial image data corresponding to the red sub-pixels in all the pixel units, an average value of the initial image data corresponding to the green sub-pixels in all the pixel units, and an average value of the initial image data corresponding to the blue sub-pixels in all the pixel units in a second unit group may be used as the compressed image data corresponding to the second unit group. Therefore, the initial image data corresponding to the plurality of pixel units in the second unit group may be compressed into the compressed image data corresponding to one pixel unit, so that the transmission of data amount can be reduced, and the bandwidth can be reduced.

In some examples, decompressing the compressed image data corresponding to the non-gaze region may specifically include: determining the compressed image data in one-to-one correspondence with the plurality of first unit groups as target image data corresponding to each pixel unit in each first unit group.

For example, each pixel unit includes a red sub-pixel, a green sub-pixel, and a blue sub-pixel, as an example. The compressed image data corresponding to the red sub-pixels in the compressed image data corresponding to a first unit group may be used as target image data corresponding to the red sub-pixels in the first unit group. The compressed image data corresponding to the green sub-pixels in the compressed image data corresponding to the first unit group may be used as target image data corresponding to the green sub-pixels in the first unit group. The compressed image data corresponding to the blue sub-pixels in the compressed image data corresponding to the first unit group may be used as target image data corresponding to the blue sub-pixels in the first unit group. In this way, each sub-pixel in each first unit group may correspond to the target image data.

In some examples, decompressing the compressed image data corresponding to the non-gaze region may specifically include: determining the compressed image data in one-to-one correspondence with the plurality of second unit groups as target image data corresponding to each pixel unit in each second unit group.

For example, each pixel unit includes a red sub-pixel, a green sub-pixel, and a blue sub-pixel, as an example. The compressed image data corresponding to the red sub-pixels in the compressed image data corresponding to a second unit group may be used as target image data corresponding to the red sub-pixels in the second unit group. The compressed image data corresponding to the green sub-pixels in the compressed image data corresponding to the second unit group may be used as target image data corresponding to the green sub-pixels in the second unit group. The compressed image data corresponding to the blue sub-pixels in the compressed image data corresponding to the second unit group may be used as target image data corresponding to the blue sub-pixels in the second unit group. In this way, each sub-pixel in each second unit group may correspond to the target image data.

In some examples, refreshing data of the sub-pixels in the display panel may specifically include: loading gate turn-on signals to the plurality of scanning lines row by row, so as to control the data writing circuits in the sub-pixels to electrically connect the data lines and the frequency modulation control circuits coupled to the data writing circuits row by row; loading a frequency modulation turn-on signal to each frequency modulation control line, so as to control the frequency modulation control circuits in the sub-pixels to electrically connect the data writing circuits and the storage electrodes coupled to the frequency modulation control circuits; and loading data signals to the data lines corresponding to the sub-pixels.

Figure 11A:
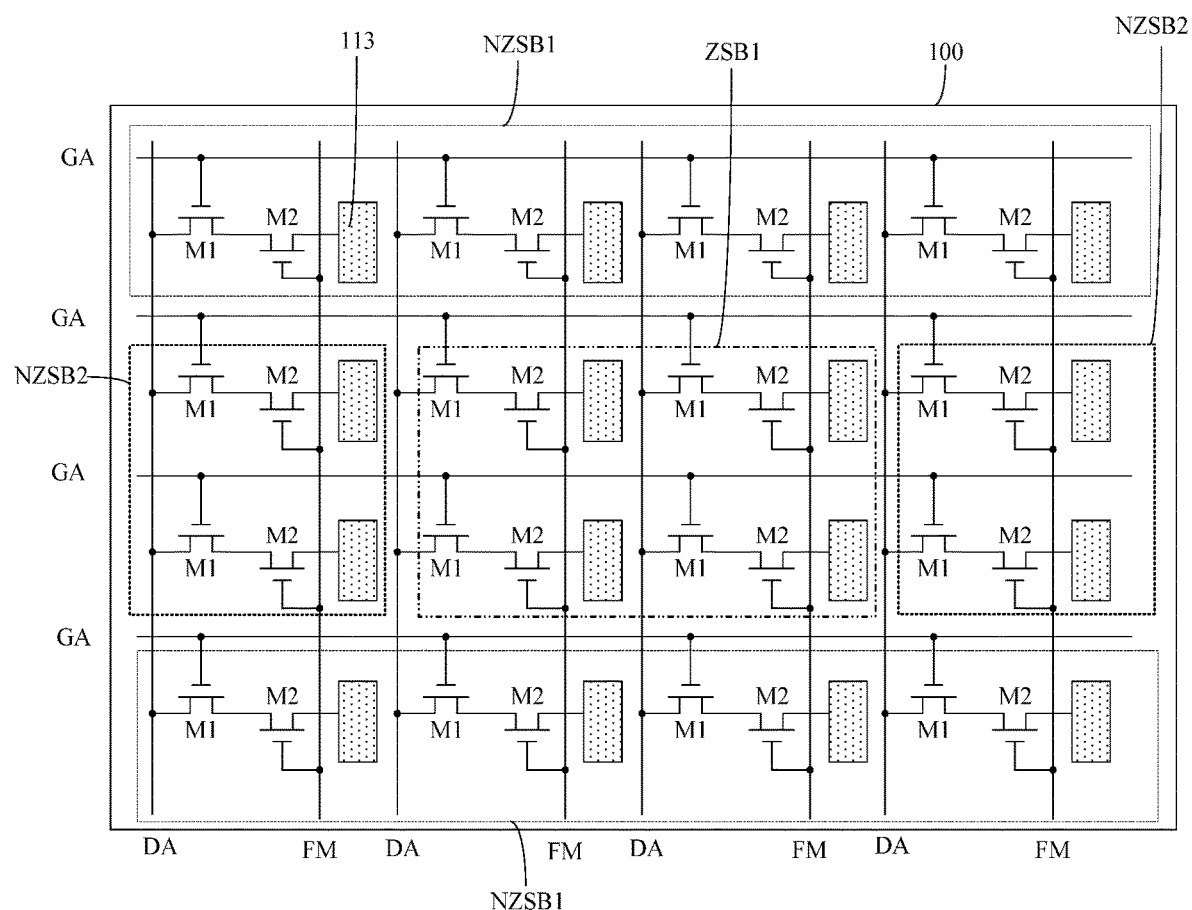
FIG. 11a is a schematic diagram of a part of another structure of a display panel according to an embodiment of the present disclosure.
Figure 11B:
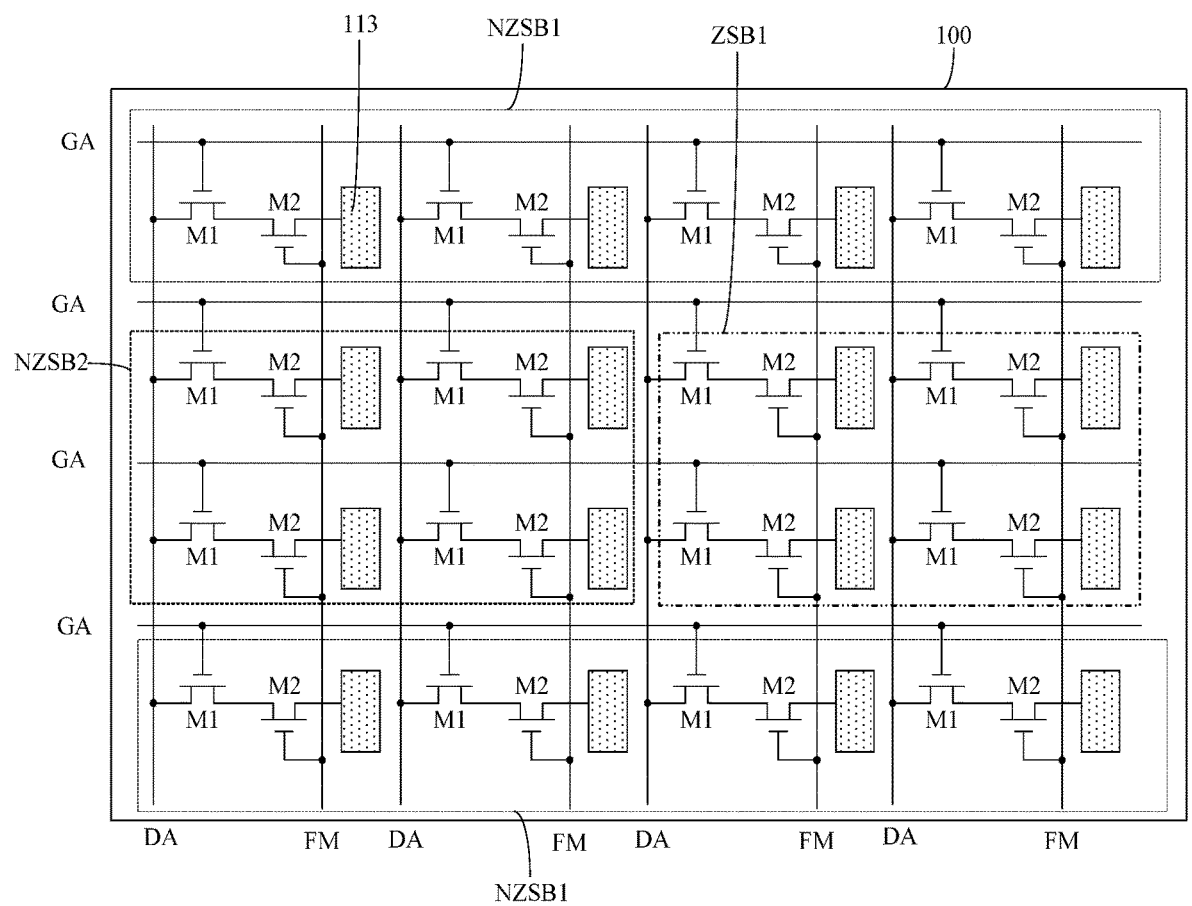
FIG. 11b is a schematic diagram of a part of another structure of a display panel according to an embodiment of the present disclosure.
Figure 12A:
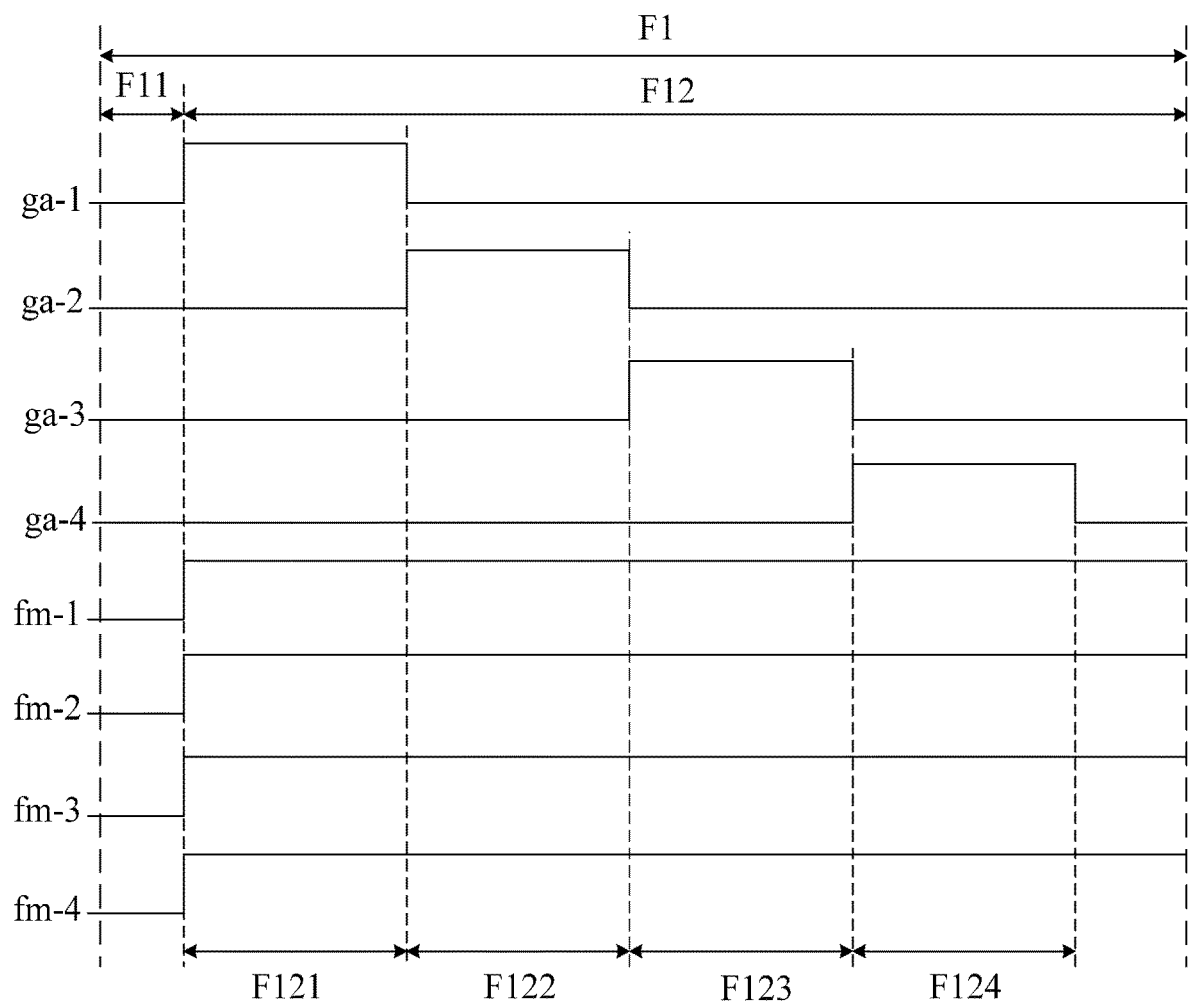
FIG. 12a is another timing diagram of signals for a first display frame according to an embodiment of the present disclosure.
Figure 12B:
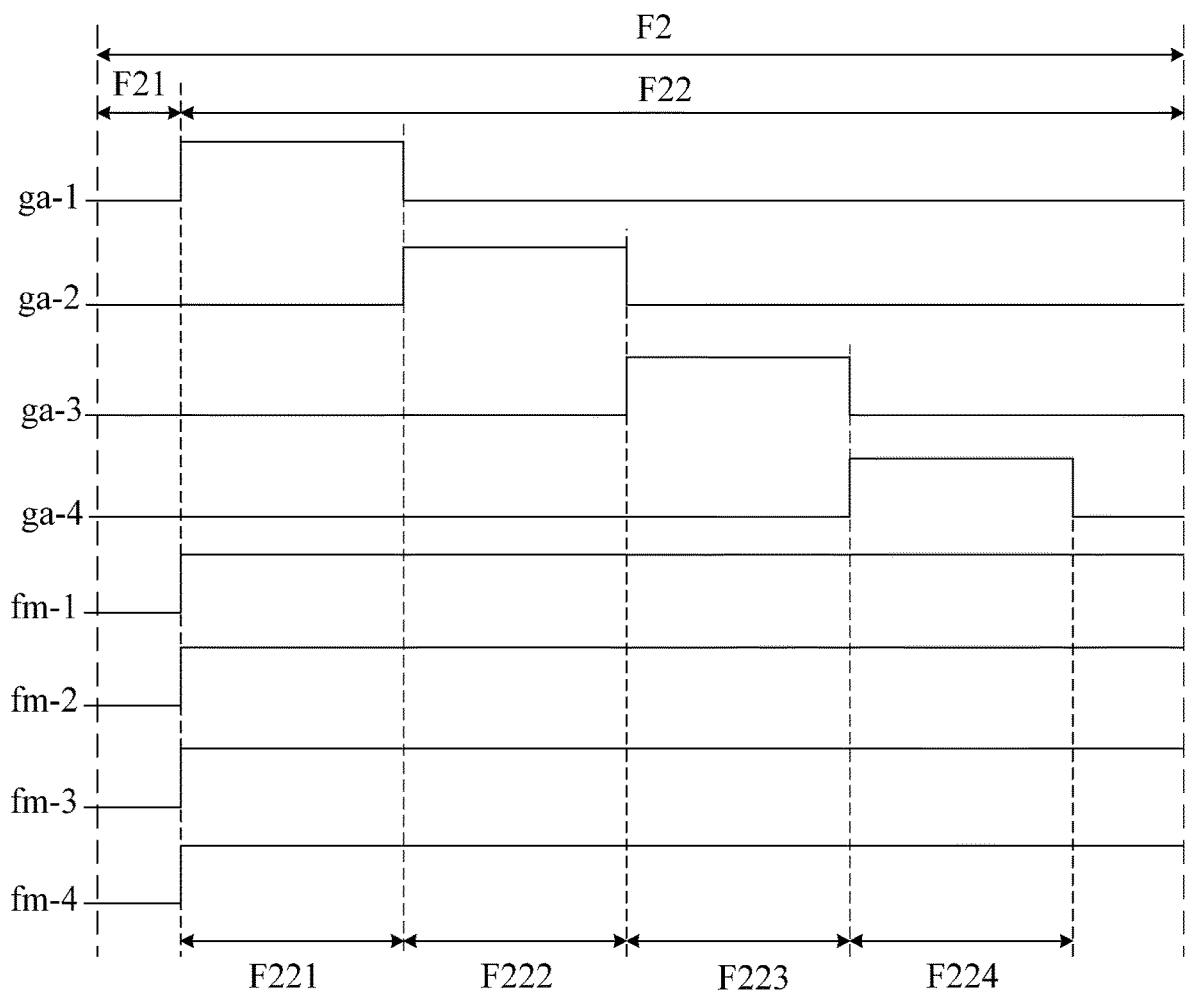
FIG. 12b is another timing diagram of signals for a second display frame according to an embodiment of the present disclosure.

The operation process of the driving method according to the embodiment of the present disclosure will be described below with reference to the display panel shown in FIGS. 11a and 11b and the signal timing diagram shown in FIGS. 12a to 12d, by taking the first to second display frames as an example.

F1 represents the first display frame, F11 represents the blanking time period in the first display frame, and F12 represents the data refresh period in the first display frame. F121 to F124 represent row scanning periods in the data refresh period in the first display frame.

F2 represents the second display frame, F21 represents the blanking time period in the second display frame, and F22 represents the data refresh period in the second display frame. F221 to F224 represent the row scanning periods in the data refresh period in the second display frame.

ga-1 represents a signal transmitted on a scanning line GA corresponding to a first row of sub-pixels spx, ga-2 represents a signal transmitted on a scanning line GA corresponding to a second row of sub-pixels spx, ga-3 represents a signal transmitted on a scanning line GA corresponding to a third row of sub-pixels spx, and ga-4 represents a signal transmitted on a scanning line GA corresponding to a fourth row of sub-pixels spx.

fm-1 represents a signal transmitted on a frequency modulation control line FM corresponding to a first column of sub-pixels spx, fm-2 represents a signal transmitted on a frequency modulation control line FM corresponding to a second column of sub-pixels spx, fm-3 represents a signal transmitted on a frequency modulation control line FM corresponding to a third column of sub-pixels spx, and fm-4 represents a signal transmitted on a frequency modulation control line FM corresponding to a fourth column of sub-pixels spx.

The driving method according to the embodiment of the present disclosure may include the following steps:

(1) In the blanking time period F11 in the first display frame, the gaze region may be rectangular. For example, as shown in FIG. 4, a coordinate $(x_0', y_0')$ of a gaze point, watched by eyes of the user, in the display region AA of the display panel may be determined by using the visual tracking technology. Then, $x_0' \pm \Delta x$ is obtained by expanding the abscissa $x_0'$ in the coordinate of the gaze point, and $y_0' \pm \Delta y$ is obtained by expanding the ordinate $y_0'$ in the coordinate of the gaze point. A specific position of the gaze region in the display region AA is determined by using $(x_0'-\Delta x, y_0'-\Delta y)$, $(x_0'-\Delta x, y_0'+\Delta y)$, $(x_0'+\Delta x, y_0'+\Delta y)$, $(x_0'+\Delta x, y_0'-\Delta y)$ as coordinates of four vertex angles of the gaze region. For example, the gaze region ZSB1, the first non-gaze region NZSB1 and the second non-gaze region NZSB2 are shown in FIG. 11a.

Some preparatory operations may be performed in the blanking time period F11, such as starting a scan of a new display frame from the bottom right corner back to the top left corner of the image.

Then, the non-gaze region is divided into a first non-gaze region and a second non-gaze region, pixel units in the first non-gaze region are divided into a plurality of first unit groups, and pixel units in the second non-gaze region are divided into a plurality of second unit groups.

Then, initial image data corresponding to one pixel unit in each first unit group is determined as the compressed image data in one-to-one correspondence with the plurality of first unit groups; and initial image data corresponding to one pixel unit in each second unit group is determined as the compressed image data in one-to-one correspondence with the plurality of second unit groups.

Then, the initial image data corresponding to the gaze region and the compressed image data corresponding to the non-gaze region are sent to the display panel.

Then, the compressed image data in one-to-one correspondence with the plurality of first unit groups is determined as target image data corresponding to each pixel unit in each first unit group; and the compressed image data in one-to-one correspondence with the plurality of second unit groups is determined as target image data corresponding to each pixel unit in each second unit group.

(2) In the row scanning period F121, a gate turn-on signal (e.g., a high level in the signal ga-1) is applied to the scanning line GA corresponding to the first row of sub-pixels spx, and a gate turn-off signal (e.g., a low level in the signals ga-2 to ga-4) is applied to the scanning lines GA corresponding to the second to fourth rows of sub-pixels spx, so as to control the data writing transistors M1 in the first row of sub-pixels spx to be turned on and control the data writing transistors M1 in the second to fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the first row to be turned on. Accordingly, the storage electrodes 113 in the first row of sub-pixels spx are electrically connected to the data lines DA. Data signals of the target image data are respectively loaded to the data lines DA corresponding to the sub-pixels spx, so that the voltages of the data signals are input to the storage electrodes 113 in the first row of sub-pixels spx, and thus the data refreshing of the first row of sub-pixels spx is completed.

In the row scanning period F122, a gate turn-on signal (e.g., a high level in the signal ga-2) is applied to the scanning line GA corresponding to the second row of sub-pixels spx, and a gate turn-off signal (e.g., a low level in the signals ga-1, ga-3 and ga-4) is applied to the scanning lines GA corresponding to the first, third, and fourth rows of sub-pixels spx, so as to control the data writing transistors M1 in the second row of sub-pixels spx to be turned on and control the data writing transistors M1 in the first, third, and fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the second row to be turned on. Accordingly, the storage electrodes 113 in the second row of sub-pixels spx are electrically connected to the data lines DA. Data signals of the target image data are respectively loaded to the data lines DA corresponding to the first column of sub-pixels and the fourth column of sub-pixels, and data signals of the initial image data are respectively loaded to the data lines DA corresponding to the second column of sub-pixels and the third column of sub-pixels, so that the voltages of the data signals are input to the storage electrodes 113 in the second row of sub-pixels spx, and thus the data refreshing of the second row of sub-pixels spx is completed.

In the row scanning period F123, a gate turn-on signal (e.g., a high level in the signal ga-3) is applied to the scanning line GA corresponding to the third row of sub-pixels spx, and a gate turn-off signal (e.g., a low level in the signals ga-1, ga-2 and ga-4) is applied to the scanning lines GA corresponding to the first, second, and fourth rows of sub-pixels spx, so as to control the data writing transistors M1 in the third row of sub-pixels spx to be turned on and control the data writing transistors M1 in the first, second, and fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the third row to be turned on. Accordingly, the storage electrodes 113 in the third row of sub-pixels spx are electrically connected to the data lines DA. Data signals of the target image data are respectively loaded to the data lines DA corresponding to the first column of sub-pixels and the fourth column of sub-pixels, and data signals of the initial image data are respectively loaded to the data lines DA corresponding to the second column of sub-pixels and the third column of sub-pixels, so that the voltages of the data signals are input to the storage electrodes 113 in the third row of sub-pixels spx, and thus the data refreshing of the third row of sub-pixels spx is completed.

In the row scanning period F124, a gate turn-on signal (e.g., a high level in the signal ga-4) is applied to the scanning line GA corresponding to the fourth row of sub-pixels spx, and a gate turn-off signal (e.g., a low level in the signals ga-1 to ga-3) is applied to the scanning lines GA corresponding to the first to third rows of sub-pixels spx, so as to control the data writing transistors M1 in the fourth row of sub-pixels spx to be turned on and control the data writing transistors M1 in the first to third rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the fourth row to be turned on. Accordingly, the storage electrodes 113 in the fourth row of sub-pixels spx are electrically connected to the data lines DA. Data signals corresponding to the target image data are respectively loaded to the data lines DA corresponding to the sub-pixels spx, so that the voltages of the data signals are input to the storage electrodes 113 in the fourth row of sub-pixels spx, and thus the data refreshing of the fourth row of sub-pixels spx is completed.

(3) In the blanking time period F21 in the second display frame, the gaze region may be rectangular. For example, as shown in FIG. 4, a coordinate $(x_0", y_0")$ of a gaze point, watched by eyes of the user, in the display region AA of the display panel may be determined by using the visual tracking technology. Then, $x_0" \pm \Delta x$ is obtained by expanding the abscissa $x_0"$ in the coordinate of the gaze point, and $y_0" \pm \Delta y$ is obtained by expanding the ordinate $y_0"$ in the coordinate of the gaze point. A specific position of the gaze region in the display region AA is determined by using $(x_0"-\Delta x, y_0"-\Delta y)$, $(x_0"-\Delta x, y_0"+\Delta y)$, $(x_0"+\Delta x, y_0"+\Delta y)$, $(x_0"+\Delta x, y_0"-\Delta y)$ as coordinates of four vertex angles of the gaze region. For example, the gaze region ZSB1, the first non-gaze region NZSB1 and the second non-gaze region NZSB2 are shown in FIG. 11b.

Some preparatory operations may be performed in the blanking time period F21, such as starting a scan of a new display frame from the bottom right corner back to the top left corner of the image.

(4) In the row scanning period F221, a gate turn-on signal (e.g., a high level in the signal ga-1) is applied to the scanning line GA corresponding to the first row of sub-pixels spx, and a gate turn-off signal (e.g., a low level in the signals ga-2 to ga-4) is applied to the scanning lines GA corresponding to the second to fourth rows of sub-pixels spx, so as to control the data writing transistors M1 in the first row of sub-pixels spx to be turned on and control the data writing transistors M1 in the second to fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the first row to be turned on. Accordingly, the storage electrodes 113 in the first row of sub-pixels spx are electrically connected to the data lines DA. Data signals of the target image data are respectively loaded to the data lines DA corresponding to the sub-pixels spx, so that the voltages of the data signals are input to the storage electrodes 113 in the first row of sub-pixels spx, and thus the data refreshing of the first row of sub-pixels spx is completed.

In the row scanning period F222, a gate turn-on signal (e.g., a high level in the signal ga-2) is applied to the scanning line GA corresponding to the second row of sub-pixels spx, and a gate turn-off signal (e.g., a low level in the signals ga-1, ga-3 and ga-4) is applied to the scanning lines GA corresponding to the first, third, and fourth rows of sub-pixels spx, so as to control the data writing transistors M1 in the second row of sub-pixels spx to be turned on and control the data writing transistors M1 in the first, third, and fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the second row to be turned on. Accordingly, the storage electrodes 113 in the second row of sub-pixels spx are electrically connected to the data lines DA. Data signals of the target image data are respectively loaded to the data lines DA corresponding to the first column of sub-pixels and the second column of sub-pixels and data signals of the initial image data are respectively loaded to the data lines DA corresponding to the third column of sub-pixels and the fourth column of sub-pixels, so that the voltages of the data signals are input to the storage electrodes 113 in the second row of sub-pixels spx, and thus the data refreshing of the second row of sub-pixels spx is completed.

In the row scanning period F223, a gate turn-on signal (e.g., a high level in the signal ga-3) is applied to the scanning line GA corresponding to the third row of sub-pixels spx, and a gate turn-off signal (e.g., a low level in the signals ga-1, ga-2 and ga-4) is applied to the scanning lines GA corresponding to the first, second, and fourth rows of sub-pixels spx, so as to control the data writing transistors M1 in the third row of sub-pixels spx to be turned on and control the data writing transistors M1 in the first, second, and fourth rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the third row to be turned on. Accordingly, the storage electrodes 113 in the third row of sub-pixels spx are electrically connected to the data lines DA. Data signals of the target image data are respectively loaded to the data lines DA corresponding to the first column of sub-pixels and the second column of sub-pixels and data signals of the initial image data are respectively loaded to the data lines DA corresponding to the third column of sub-pixels and the fourth column of sub-pixels, so that the voltages of the data signals are input to the storage electrodes 113 in the third row of sub-pixels spx, and thus the data refreshing of the third row of sub-pixels spx is completed.

In the row scanning period F224, a gate turn-on signal (e.g., a high level in the signal ga-4) is applied to the scanning line GA corresponding to the fourth row of sub-pixels spx, and a gate turn-off signal (e.g., a low level in the signals ga-1 to ga-3) is applied to the scanning lines GA corresponding to the first to third rows of sub-pixels spx, so as to control the data writing transistors M1 in the fourth row of sub-pixels spx to be turned on and control the data writing transistors M1 in the first to third rows of sub-pixels spx to be turned off. Furthermore, a frequency modulation turn-on signal (such as a high level in the signals fm-1 to fm-4) is applied to the frequency modulation control lines FM corresponding to the first to fourth columns of sub-pixels spx, so as to control the frequency modulation control transistors M2 in the first to fourth columns of sub-pixels spx in the fourth row to be turned on. Accordingly, the storage electrodes 113 in the fourth row of sub-pixels spx are electrically connected to the data lines DA. Data signals corresponding to the target image data are respectively loaded to the data lines DA corresponding to the sub-pixels spx, so that the voltages of the data signals are input to the storage electrodes 113 in the fourth row of sub-pixels spx, and thus the data refreshing of the fourth row of sub-pixels spx is completed.

Figure 13:
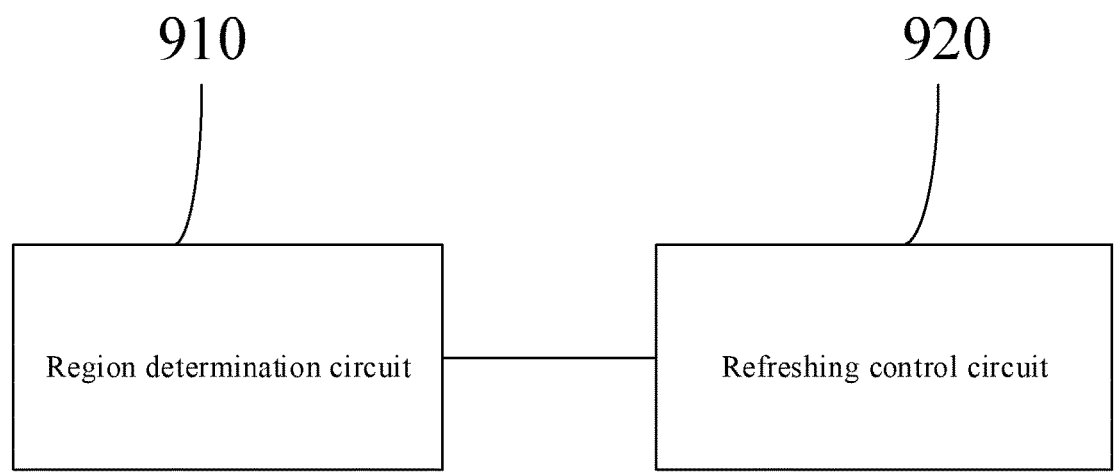
FIG. 13 is a schematic diagram of a structure of a display apparatus according to an embodiment of the present disclosure.

As shown in FIG. 13, a driving circuit for a display panel according to an embodiment of the present disclosure may include:

a region determination circuit 910 configured to determine a gaze region, watched by eyes of a user, in a display region of the display panel;

a refreshing control circuit 920 configured to refresh data of at least some of the sub-pixels in the display panel according to a set rule and in combination with the gaze region.

For example, the region determination circuit 910 is further configured to determine the gaze region, watched by eyes of the user, in the display region of the display panel within K display frames of a refresh cycle; where the refresh cycle includes M consecutive display frames; M is an integer greater than 1, K is an integer greater than 0;

The refreshing control circuit 920 is further configured to in the refresh cycle, refresh data of the sub-pixels in the gaze region by adopting a first refresh frequency, and refresh data of the sub-pixels in a non-gaze region except the gaze region by adopting a second refresh frequency; wherein the first refresh frequency is different from the second refresh frequency.

For example, the region determination circuit 910 is further configured to determine the gaze region, watched by eyes of the user, in the display region of the display panel within at least one display frame;

The refreshing control circuit 920 is further configured to compress initial image data corresponding to the non-gaze region except the gaze region in the display region, to determine the compressed image data corresponding to the non-gaze region; wherein a data amount of the compressed image data corresponding to the non-gaze region is less than that of the initial image data corresponding to the non-gaze region; send the initial image data corresponding to the gaze region and the compressed image data corresponding to the non-gaze region to the display panel, and then decompress the compressed image data corresponding to the non-gaze region; and refresh data of the sub-pixels in the display panel according to the initial image data corresponding to the gaze region and the decompressed target image data corresponding to the non-gaze region.

It should be noted that the operating principle and the specific implementation of the driving circuit are the same as those of the driving method in the above embodiments, and therefore, the operating procedure of the driving circuit may be implemented by referring to the specific implementation in the above embodiments, and is not described again here.

In some examples, the driving circuit may be entirely implemented by software, may be entirely implemented by hardware, or may be implemented by combination of software and the hardware.

In some examples, the driving circuit may be a driving IC (Integrated Circuit).

The embodiment of the present disclosure further provides a display apparatus, which includes the display panel according to the embodiment of the present disclosure. The principle of the display apparatus for solving the problems is similar to that of the display panel, so the display apparatus may be implemented by referring to the display panel, which is not described again here.

The embodiment of the present disclosure further provides a display apparatus, which includes the driving circuit for the display panel according to the embodiment of the present disclosure. The principle of the display apparatus for solving the problems is similar to that of the driving circuit, so the display apparatus may be implemented by referring to the driving circuit, which is not described again here.

The embodiment of the present disclosure further provides a display apparatus, which includes the display panel and the driving circuit according to the embodiment of the present disclosure. The principle of the display apparatus for solving the problems is similar to those of the display panel and the driving circuit, so the display apparatus may be implemented by referring to the display panel and the driving circuit, which is not described again here.

In a specific implementation, in the embodiment of the present disclosure, the display apparatus may be any product or component with a display function, such as a mobile phone, a tablet computer, a television, a display, a notebook computer, a digital photo frame, a navigator or the like. Other essential components of the display apparatus should be included as understood by a person skilled in the art, and are not described herein and should not be construed as limiting the present disclosure.

It will be apparent that, various changes and modifications for the present disclosure may be made by a person skilled in the art without departing from the spirit and scope of the present disclosure. Thus, if these changes and modifications for the present disclosure fall within the scope of the claims and their equivalents, the present disclosure is intended to also encompass such modifications and variations.

What is claimed is:

1. A driving method for driving a display panel, comprising:
    determining a gaze region, watched by eyes of a user, in a display region of the display panel; and
    refreshing data of at least some of sub-pixels in the display panel according to the gaze region;
    wherein the gaze region, watched by eyes of the user, in the display region of the display panel is determined within K display frames of a refresh cycle; where the refresh cycle comprises M consecutive display frames; M is an integer greater than 1, K is an integer greater than 0; and
    the refreshing data of at least some of sub-pixels in the display panel according to the gaze region comprises:
    in the refresh cycle, refreshing data of the sub-pixels in the gaze region by adopting a first refresh frequency, and refreshing data of the sub-pixels in a non-gaze region except the gaze region by adopting a second refresh frequency;
    wherein the first refresh frequency is different from the second refresh frequency;
    wherein the second refresh frequency is lower than the first refresh frequency; and
    wherein the second refresh frequency is (M−K)/M times of the first refresh frequency; where K<M.

2. The driving method according to claim 1, wherein the refreshing data of the sub-pixels in the gaze region by adopting a first refresh frequency, and refreshing data of the sub-pixels in a non-gaze region except the gaze region by adopting a second refresh frequency comprises:
    refreshing data of the sub-pixels only in the gaze region in the K display frames; and
    refreshing data of the sub-pixels in both the gaze region and the non-gaze region in display frames except the K display frames in the refresh cycle.

3. The driving method according to claim 2, wherein M=2, the gaze region, watched by eyes of the user, in the display region of the display panel is determined within an odd display frame of the refresh cycle;
    the refreshing data of the sub-pixels only in the gaze region in the K display frames; and refreshing data of the sub-pixels in both the gaze region and the non-gaze region in display frames except the K display frames in the refresh cycle comprises:
    refreshing data of the sub-pixels only in the gaze region within the odd display frame of the refresh cycle; and
    refreshing data of the sub-pixels in both the gaze region and the non-gaze region in an even display frame of the refresh cycle.

4. The driving method according to claim 3, wherein the display region comprises a plurality of sub-pixels, a plurality of scanning lines, a plurality of data lines, and a plurality of frequency modulation control lines provided therein;
    one row of the sub-pixels corresponds to at least one scanning line of the plurality of scanning lines, and
    one column of the sub-pixels corresponds to at least one data line of the plurality of data lines and at least one frequency modulation control line of the plurality of frequency modulation control lines;
    each sub-pixel of the plurality of sub-pixels comprises a data writing circuit, a frequency modulation control circuit and a storage electrode;
    wherein a control terminal of the data writing circuit is coupled to a corresponding scanning line, a first terminal of the data writing circuit is coupled to a corresponding data line, and a second terminal of the data writing circuit is coupled to a first terminal of the frequency modulation control circuit; a control terminal of the frequency modulation control circuit is coupled to a corresponding frequency modulation control line, and a second terminal of the frequency modulation control circuit is coupled to a corresponding storage electrode;
    the refreshing data of the sub-pixels only in the gaze region within the odd display frame of the refresh cycle comprises:
    loading gate turn-on signals to the plurality of scanning lines row by row in the odd display frame, so as to control the data writing circuits in the sub-pixels row by row to electrically connect the data lines to the frequency modulation control circuits coupled to the data writing circuits, respectively;
    loading frequency modulation turn-on signals to frequency modulation control lines corresponding to the sub-pixels in the gaze region and loading frequency modulation turn-off signals to frequency modulation control lines except the frequency modulation control lines corresponding to the sub-pixels in the gaze region when the gate turn-on signals are loaded to the scanning lines corresponding to sub-pixels in the gaze region, to control the frequency modulation control circuits in the sub-pixels in the gaze region to electrically connect the data writing circuits and the storage electrodes coupled to the frequency modulation control circuits, respectively; and
    loading data signals to the data lines corresponding to the sub-pixels in the gaze region, respectively,
    the refreshing data of the sub-pixels in both the gaze region and the non-gaze region in the even display frame of the refresh cycle comprises:
    loading gate turn-on signals to the plurality of scanning lines row by row in the even display frame, so as to control the data writing circuits in the sub-pixels row by row to electrically connect the data lines to the frequency modulation control circuits coupled to the data writing circuits, respectively;
    loading frequency modulation turn-on signals to the plurality of frequency modulation control lines, so as to control the frequency modulation control circuits in the sub-pixels to electrically connect the data writing circuits to the storage electrodes coupled to the frequency modulation control circuits, respectively; and
    loading data signals to the data lines corresponding to the plurality of sub-pixels.

5. The driving method according to claim 2, wherein M=2, the gaze region, watched by eyes of the user, in the display region of the display panel is determined within an even display frame of the refresh cycle;
    the refreshing data of the sub-pixels only in the gaze region in the K display frames; and refreshing data of the sub-pixels in both the gaze region and the non-gaze region in display frames except the K display frames in the refresh cycle comprises:
    refreshing data of the sub-pixels in both the gaze region and the non-gaze region within an odd display frame of the refresh cycle; and
    refreshing data of the sub-pixels only in the gaze region in an even display frame of the refresh cycle.

6. The driving method according to claim 5, wherein the display region comprises a plurality of sub-pixels, a plurality of scanning lines, a plurality of data lines, and a plurality of frequency modulation control lines provided therein;
 one row of the sub-pixels corresponds to at least one scanning line of the plurality of scanning lines, and
 one column of the sub-pixels corresponds to at least one data line of the plurality of data lines and at least one frequency modulation control line of the plurality of frequency modulation control lines;
 each sub-pixel of the plurality of sub-pixels comprises a data writing circuit, a frequency modulation control circuit and a storage electrode;
 wherein a control terminal of the data writing circuit is coupled to a corresponding scanning line, a first terminal of the data writing circuit is coupled to a corresponding data line, and a second terminal of the data writing circuit is coupled to a first terminal of the frequency modulation control circuit; a control terminal of the frequency modulation control circuit is coupled to a corresponding frequency modulation control line, and a second terminal of the frequency modulation control circuit is coupled to a corresponding storage electrode;
 the refreshing data of the sub-pixels in both the gaze region and the non-gaze region within the odd display frame of the refresh cycle comprises:
 loading gate turn-on signals to the plurality of scanning lines row by row in the odd display frame, so as to control the data writing circuits in the sub-pixels row by row to electrically connect the data lines and the frequency modulation control circuits coupled to the data writing circuits, respectively;
 loading frequency modulation turn-on signals to the plurality of frequency modulation control lines, so as to control the frequency modulation control circuits in the sub-pixels to electrically connect the data writing circuits and the storage electrodes coupled to the frequency modulation control circuits, respectively; and
 loading data signals to the data lines corresponding to the plurality of sub-pixels, respectively;
 the refreshing data of the sub-pixels only in the gaze region in the even display frame of the refresh cycle comprises:
 loading gate turn-on signals to the plurality of scanning lines row by row in the even display frame, so as to control the data writing circuits in the sub-pixels row by row to electrically connect the data lines and the frequency modulation control circuits coupled to the data writing circuits, respectively;
 loading frequency modulation turn-on signals to frequency modulation control lines corresponding to the sub-pixels in the gaze region and loading frequency modulation turn-off signals to frequency modulation control lines except the frequency modulation control lines corresponding to the sub-pixels in the gaze region when the gate turn-on signals are loaded to scanning lines corresponding to sub-pixels in the gaze region, to control frequency modulation control circuits in the sub-pixels in the gaze region to electrically connect the data writing circuits and the storage electrodes coupled to the frequency modulation control circuits, respectively; and
 loading data signals to the data lines corresponding to the sub-pixels in the gaze region.

7. The driving method according to claim 1, wherein the gaze region, watched by eyes of the user, in the display region of the display panel is determined within at least one display frame;
 the refreshing data of at least some of the sub-pixels in the display panel according to the gaze region comprises:
 compressing initial image data corresponding to the non-gaze region except the gaze region in the display region, to determine the compressed image data corresponding to the non-gaze region; wherein a data amount of the compressed image data corresponding to the non-gaze region is less than that of the initial image data corresponding to the non-gaze region;
 sending the initial image data corresponding to the gaze region and the compressed image data corresponding to the non-gaze region to the display panel, and then decompressing the compressed image data corresponding to the non-gaze region; and
 refreshing data of the sub-pixels in the display panel according to the initial image data corresponding to the gaze region and decompressed target image data corresponding to the non-gaze region.

8. The driving method according to claim 7, wherein the compressing initial image data corresponding to the non-gaze region except the gaze region in the display region, to determine the compressed image data corresponding to the non-gaze region comprises:
 dividing the non-gaze region into a first non-gaze region and a second non-gaze region, dividing pixel units in the first non-gaze region into a plurality of first unit groups, and dividing pixel units in the second non-gaze region into a plurality of second unit groups; wherein the sub-pixels in the first non-gaze region and the sub-pixels in the gaze region are located in different rows; the sub-pixels in the second non-gaze region and the sub-pixels in the gaze region are located in a same row; the pixel unit comprises multiple sub-pixels, the first unit group comprises a plurality of pixel units adjacent to each other, and the second unit group comprises a plurality of pixel units adjacent to each other; and
 compressing initial image data corresponding to the pixel units in the first unit groups and the second unit groups, respectively, and determining the compressed image data in one-to-one correspondence with the plurality of first unit groups, and to determine the compressed image data in one-to-one correspondence with the plurality of second unit groups.

9. The driving method according to claim 8, wherein the determining the compressed image data in one-to-one correspondence with the plurality of first unit groups comprises:
 determining initial image data corresponding to one pixel unit in the respective first unit groups as the compressed image data in one-to-one correspondence with the plurality of first unit groups; or
 determining an average value of initial image data corresponding to the sub-pixels of a same color of the pixel units in the respective first unit groups as the compressed image data in one-to-one correspondence with the plurality of first unit groups.

10. The driving method according to claim 8, wherein the determining the compressed image data in one-to-one correspondence with the plurality of second unit groups comprises:
 determining initial image data corresponding to one pixel unit in the respective second unit groups as the compressed image data in one-to-one correspondence with the plurality of second unit groups; or
 determining an average value of initial image data corresponding to the sub-pixels of a same color of the pixel units in the respective second unit groups as the compressed image data in one-to-one correspondence with the plurality of second unit groups.

11. The driving method according to claim 10, wherein the decompressing the compressed image data corresponding to the non-gaze region comprises:
determining the compressed image data in one-to-one correspondence with the plurality of first unit groups as target image data corresponding to each pixel unit in the respective first unit groups; and
determining the compressed image data in one-to-one correspondence with the plurality of second unit groups as target image data corresponding to each pixel unit in the respective second unit groups.

12. The driving method according to claim 11, wherein the display region comprises a plurality of sub-pixels, a plurality of scanning lines, a plurality of data lines, and a plurality of frequency modulation control lines provided therein;
one row of the sub-pixels corresponds to at least one scanning line of the plurality of scanning lines, and
one column of the sub-pixels corresponds to at least one data line of the plurality of data lines and at least one frequency modulation control line of the plurality of frequency modulation control lines;
each sub-pixel of the plurality of sub-pixels comprises a data writing circuit, a frequency modulation control circuit and a storage electrode;
wherein a control terminal of the data writing circuit is coupled to a corresponding scanning line, a first terminal of the data writing circuit is coupled to a corresponding data line, and a second terminal of the data writing circuit is coupled to a first terminal of the frequency modulation control circuit; a control terminal of the frequency modulation control circuit is coupled to a corresponding frequency modulation control line, and a second terminal of the frequency modulation control circuit is coupled to a corresponding storage electrode;
the refreshing data of the sub-pixels in the display panel comprises:
loading gate turn-on signals to the plurality of scanning lines row by row, so as to control the data writing circuits in the sub-pixels row by row to electrically connect the data lines and the frequency modulation control circuits coupled to the data writing circuits, respectively;
loading frequency modulation turn-on signals to the frequency modulation control lines, respectively, so as to control the frequency modulation control circuits in the sub-pixels to electrically connect the data writing circuits and the storage electrodes coupled to the frequency modulation control circuits, respectively; and
loading data signals to the data lines corresponding to the sub-pixels.

13. A driving circuit for a display panel, comprising:
a region determination circuit configured for determining a gaze region, watched by eyes of a user, in a display region of the display panel; and
a refreshing control circuit configured for refreshing data of at least some of the sub-pixels in the display panel according to the gaze region,
wherein the gaze region, watched by eyes of the user, in the display region of the display panel is determined within K display frames of a refresh cycle; where the refresh cycle comprises M consecutive display frames; M is an integer greater than 1, K is an integer greater than 0; and
the refreshing data of at least some of sub-pixels in the display panel according to the gaze region comprises:
in the refresh cycle, refreshing data of the sub-pixels in the gaze region by adopting a first refresh frequency, and refreshing data of the sub-pixels in a non-gaze region except the gaze region by adopting a second refresh frequency;
wherein the first refresh frequency is different from the second refresh frequency;
wherein the second refresh frequency is lower than the first refresh frequency; and
wherein the second refresh frequency is $(M-K)/M$ times of the first refresh frequency; where $K<M$.

14. A display apparatus, comprising a display panel,
comprising a plurality of sub-pixels, a plurality of scanning lines, a plurality of data lines, and a plurality of frequency modulation control lines provided therein; wherein
one row of the sub-pixels corresponds to at least one scanning line of the plurality of scanning lines, and
one column of the sub-pixels corresponds to at least one data line of the plurality of data lines and at least one frequency modulation control line of the plurality of frequency modulation control lines;
each sub-pixel comprises a data writing circuit, a frequency modulation control circuit and a storage electrode;
wherein a control terminal of the data writing circuit is coupled to a corresponding scanning line, a first terminal of the data writing circuit is coupled to a corresponding data line, and a second terminal of the data writing circuit is coupled to a first terminal of the frequency modulation control circuit; and
the data writing circuit is configured to electrically connect the data line and the frequency modulation control circuit coupled to the data writing circuit in response to a signal on the scanning line coupled to the data writing circuit; and
a control terminal of the frequency modulation control circuit is coupled to a corresponding frequency modulation control line, and a second terminal of the frequency modulation control circuit is coupled to a corresponding storage electrode; and
the frequency modulation control circuit is configured to electrically connect the data writing circuit and the storage electrode coupled to the frequency modulation control circuit in response to a signal on the corresponding frequency modulation control line coupled to the frequency modulation control circuit, and a driving circuit for the display panel,
wherein the driving circuit comprises:
a region determination circuit configured for determining a gaze region, watched by eyes of a user, in a display region of the display panel; and
a refreshing control circuit configured for refreshing data of at least some of the sub-pixels in the display panel according to the gaze region,
wherein the gaze region, watched by eyes of the user, in the display region of the display panel is determined within K display frames of a refresh cycle; where the refresh cycle comprises M consecutive display frames; M is an integer greater than 1, K is an integer greater than 0; and
the refreshing data of at least some of sub-pixels in the display panel according to the gaze region comprises:
in the refresh cycle, refreshing data of the sub-pixels in the gaze region by adopting a first refresh frequency, and refreshing data of the sub-pixels in a non-gaze region except the gaze region by adopting a second refresh frequency;

wherein the first refresh frequency is different from the second refresh frequency;

wherein the second refresh frequency is lower than the first refresh frequency; and wherein the second refresh frequency is (M−K)/M times of the first refresh frequency; where K<M.

15. The display apparatus according to claim 14, wherein the data writing circuit comprises a data writing transistor;

a gate electrode of the data writing transistor is used as the control terminal of the data writing circuit, a first electrode of the data writing transistor is used as the first terminal of the data writing circuit, and a second electrode of the data writing transistor is used as the second terminal of the data writing circuit.

16. The display apparatus according to claim 15, wherein the frequency modulation control circuit comprises a frequency modulation control transistor;

a gate electrode of the frequency modulation control transistor is used as the control terminal of the frequency modulation control circuit, a first electrode of the frequency modulation control transistor is used as the first terminal of the frequency modulation control circuit, and a second electrode of the frequency modulation control transistor is used as the second terminal of the frequency modulation control circuit.

* * * * *